United States Patent
Abdallah et al.

(10) Patent No.: US 12,051,394 B2
(45) Date of Patent: Jul. 30, 2024

(54) AUTOMATED MIDI MUSIC COMPOSITION SERVER

(71) Applicant: BYTEDANCE INC., Wilmington, DE (US)

(72) Inventors: Samer Abdallah, London (GB); Jonathan Cooper, London (GB); Gabriele Medeot, London (GB); Edmund Newton-Rex, London (GB); Marco Selvi, London (GB); Jason Storey, London (GB); Alexandru Teodoru, London (GB)

(73) Assignee: BYTEDANCE INC., Wilmington, DE (US)

( * ) Notice: Subject to any disclaimer, the term of this patent is extended or adjusted under 35 U.S.C. 154(b) by 288 days.

(21) Appl. No.: 16/954,945

(22) PCT Filed: Dec. 17, 2018

(86) PCT No.: PCT/EP2018/085327
§ 371 (c)(1),
(2) Date: Jun. 17, 2020

(87) PCT Pub. No.: WO2019/121577
PCT Pub. Date: Jun. 27, 2019

(65) Prior Publication Data
US 2020/0380940 A1 Dec. 3, 2020

(30) Foreign Application Priority Data

Dec. 18, 2017 (GB) .................................. 1721212
Dec. 18, 2017 (GB) .................................. 1721215
(Continued)

(51) Int. Cl.
G10H 1/00 (2006.01)
G06N 3/08 (2023.01)
G06N 7/01 (2023.01)

(52) U.S. Cl.
CPC ............ *G10H 1/0025* (2013.01); *G06N 3/08* (2013.01); *G06N 7/01* (2023.01); *G10H 1/0058* (2013.01);
(Continued)

(58) Field of Classification Search
CPC .. G10H 1/0025; G10H 1/0058; G10H 1/0066; G10H 2210/145; G10H 2240/056;
(Continued)

(56) References Cited

U.S. PATENT DOCUMENTS 6,504,089 B1   1/2003   Negishi et al.
10,679,596 B2  6/2020   Balassanian et al.
(Continued)

FOREIGN PATENT DOCUMENTS

CN   101454824 A   6/2009
CN   104036825 A   9/2014
(Continued)

OTHER PUBLICATIONS

Lafferty et al., Conditional Random Fields: Probabilistic Models for Segmenting and Labeling Sequence Data, University of Pennsylvania ScholarlyCommons, Departmental Papers (CIS), Jun. 28, 2001 (Year: 2001).*
(Continued)

*Primary Examiner* — Jianchun Qin
(74) *Attorney, Agent, or Firm* — BakerHostetler

(57) ABSTRACT

A music composition system for composing music segments comprises: a computer interface comprising at least one external input for receiving from an external device a request for a musical composition; a controller configured to
(Continued)

determine based on a request received at the external input a plurality of musical parts for the musical composition; and a composition engine configured to generate, for each of the determined musical parts, at least one musical segment in digital musical notation format, the musical segments configured to cooperate musically when performed simultaneously. The computer interface comprises at least one external output configured to output a response to the request, the request comprising or indicating each of the musical segments in digital musical notation format for rendering into audio data at the external device.

20 Claims, 12 Drawing Sheets

(30) Foreign Application Priority Data

Dec. 18, 2017 (GB) ...................................... 1721216
Feb. 9, 2018 (GB) ...................................... 1802182

(52) U.S. Cl.
CPC ..... *G10H 1/0066* (2013.01); *G10H 2210/145* (2013.01); *G10H 2240/056* (2013.01); *G10H 2240/075* (2013.01); *G10H 2240/131* (2013.01)

(58) Field of Classification Search
CPC ....... G10H 2240/075; G10H 2240/131; G06N 3/08; G06N 7/005
See application file for complete search history.

(56) References Cited

U.S. PATENT DOCUMENTS

| | | | |
|---|---|---|---|
| 2002/0194984 A1* | 12/2002 | Pachet | G10H 1/0025 84/609 |
| 2003/0128825 A1* | 7/2003 | Loudermilk | H04M 3/4285 379/102.01 |
| 2008/0190272 A1 | 8/2008 | Taub et al. | |
| 2009/0288546 A1* | 11/2009 | Takeda | G10L 25/48 84/612 |
| 2012/0297959 A1 | 11/2012 | Serletic et al. | |
| 2016/0148605 A1 | 5/2016 | Minamitaka | |
| 2017/0092247 A1 | 3/2017 | Silverstein | |
| 2018/0032611 A1* | 2/2018 | Cameron | G06F 16/685 |
| 2018/0173390 A1* | 6/2018 | Dunne | G06F 3/0481 |
| 2020/0380940 A1 | 12/2020 | Abdallah et al. | |
| 2020/0394990 A1 | 12/2020 | Chanquion et al. | |
| 2021/0383781 A1 | 12/2021 | Moyer | |
| 2022/0180767 A1 | 6/2022 | Aharonson et al. | |

FOREIGN PATENT DOCUMENTS

| | | |
|---|---|---|
| EP | 1956586 A2 | 8/2008 |
| JP | H09-293083 A | 11/1997 |
| JP | 2003-195866 A | 7/2003 |
| JP | 2004-226892 A | 8/2004 |
| JP | 2016-099445 A | 5/2016 |
| WO | WO 2001/086628 A2 | 11/2001 |
| WO | WO 2006/027605 A2 | 3/2006 |

OTHER PUBLICATIONS

Paulraj Ponniah, "Database Design and Development: An Essential Guide for IT Professionals", Jan. 1, 2005, ISBN (Online): 9780471728993. Chapter 19: Database Systems and the Web (Year: 2005).*

International Patent Application No. PCT/EP2018/085327; Int'l Search Report and the Written Opinion; dated Apr. 16, 2019; 20 pages.

David Cope; "The Algorithmic Composer"; vol. 16; © 2000.

International Patent Application No. PCT/EP2018/085326; Int'l Search Report and the Written Opinion; dated Jul. 2, 2019; 21 pages.

David Cope; "The Algorithmic Composer"; The Computer Music and Digital Audio Series; vol. 16; © 2000; 302 pages.

M. Xiaohui; "Artificial intelligence synthesized music is coming. Is this an opportunity or challenge?"; https://www.iyiou.com/news/ 2017020638820; iyiou.com; Feb. 2017; accessed May 18, 2023; 10 pages.

* cited by examiner

AUTOMATED MIDI MUSIC COMPOSITION SERVER

The present application is the national phase application of PCT International Patent Application No. PCT/EP2018/085327, filed on Dec. 17, 2018, which claims priority to British Patent Application No. GB1721212.7, GB1721215.0, and GB1721216.8, filed on Dec. 18, 2017, and claims priority to British Patent Application No. GB1802182.4, filed on Feb. 9, 2018, all of which are incorporated herein by reference in their entireties.

TECHNICAL FIELD

This disclosure relates to automated music production.

BACKGROUND

Automated music production based on artificial intelligence (AI) is an emerging technology with significant potential. Research has been conducted into training AI systems, such as neural networks, to compose original music based on a limited number of input parameters. Whilst this is an exciting area of research, many of the approaches developed to date suffer from problems of flexibility and quality of the musical output, which in turn limits their usefulness in a practical context.

SUMMARY

One aim of this disclosure is to provide an automated music production system with an improved interface that allows flexible and sophisticated interaction with the system. This opens up new and exciting use cases where the system can be used as a creative tool for musicians, producers and the like in a way that suits their individual needs and preferences.

A first aspect of the invention provides a music composition system for composing music segments, the music composition system comprising: a computer interface comprising at least one external input for receiving from an external device a request for a musical composition; a controller configured to determine based on a request received at the external input a plurality of musical parts for the musical composition; and a composition engine configured to generate, for each of the determined musical parts, at least one musical segment in digital musical notation format, the musical segments configured to cooperate musically when performed simultaneously; wherein the computer interface comprises at least one external output configured to output a response to the request, the request comprising or indicating each of the musical segments in digital musical notation format for rendering into audio data at the external device.

In embodiments, the controller may be configured to determine from the request a style parameter identifying a style attribute for the composition and the composition engine is configured to generate the musical segments based on the style parameter.

The composition engine may have a plurality of composition modules, wherein the composition engine may be configured to select one or more of the composition modules based on the request.

The one or more of the composition modules may be based on the style parameter.

Each of the composition modules may be associated with a respective style indicator, and the one or more composition modules may be selected by matching the style parameter to their style indicator(s)

Each of the composition modules may be in the form of a probabilistic sequence model.

The probabilistic sequence model may be a trained neural network.

The composition engine may have a first composition module configured to generate at least a first music segment for a first of the musical parts, and a second composition module configured to generate at least a second music segment for a second of the musical parts based on data of the first music segment.

The first music segment may embody a chord sequence and the second music segment may embody a melody or harmony composed to fit the chord sequence.

The first music segment may embody a melody and the second music segment may embody a harmonization of the melody.

The composition engine may have an input configured to receive a percussion part and at least one of the segments may be composed based on the percussion part.

The controller may be configured to select from a set of available composition parameters composition parameters for the composition of the segments using a probabilistic selection process.

The controller may be configured to determine a set of weightings based on the request and the composition settings may be selected probabilistically according to the determined weightings.

The weightings may be determined based on the style parameter.

The composition engine may be configured to store each of the music segments in a database is association with a segment identifier.

The computer interface may be configured to assign a job identifier to the request which is associated with each of the segment identifiers.

The response to the request may comprise the job identifier and thereby indicate the music segments.

A second aspect of the invention provides a method of composing music segments, the method comprising implementing at a music composition system the following steps: receiving from an external device a request for a musical composition; determining based on the request a plurality of musical parts for the musical composition; generating, by a composition engine, for each of the determined musical parts, at least one musical segment in digital musical notation format, the musical segments configured to cooperate musically when performed simultaneously; and outputting a response to the request, the request comprising or indicating each of the musical segments in digital musical notation format for rendering into audio data at the external device.

A third aspect of the invention provides a computer program product comprising executable instructions stored on a non-transitory computer-readable storage medium and configured, when executed at a music composition system, to cause the music composition system to implement the steps of the method.

BRIEF DESCRIPTION OF FIGURES

For a better understanding of the present invention, and to show how embodiments of the same may be carried into effect, reference is made to the following figures in which.

DETAILED DESCRIPTION OF EXAMPLE EMBODIMENTS

An AI music production system will now be described that can use AI to compose and/or produce original music.

The AI music production system may be referred below to as the "Jukedeck" system.

Composing music has traditionally been the sole domain of humans. Even with demonstrated advances in AI technologies, it has proven to be extremely difficult to apply those technologies to music composition, such is music's complexity and nature. One form of AI, machine learning, is now commonly used in fields such as image and speech recognition. However, its application to music has previously seen little success. Reasons for this include the following:

1. Music is incredibly complex; it is multi-dimensional, operating in both the pitch and time spaces, often with numerous musical components simultaneously interacting in many different ways. An AI system must be able to comprehend and account for this complexity.
2. Historically, music production (arranging a piece, setting its volume levels, applying effects, etc.) has largely been a complex manual process that has required a variety of advanced tools to complete. In order to automatically generate a piece of music that can be used in the wide variety of settings in which music is used today, a system must not only automatically generate the musical score; it must also automate this complex music production process.

Introduction to Jukedeck's Technology

The Jukedeck system incorporates a full-stack, cloud-based music composer that addresses the complexities historically associated with AI and music as discussed above. This technology is based on advanced music theory and combines neural networks in novel ways to compose and produce unique, professional quality music in a matter of seconds. The end-to-end technology stack can be summarised as follows: (i) a genre and other overarching musical attributes are chosen, (ii) these elections are then combined to form a lens through which individual notes and sequences of notes are composed (music composition), (iii) these composed notes are then produced into a full audio track (music production). Below is a high-level overview of the stack, from composition through production to a user interface/API.

End-to-End Technology Stack

Figure 12:
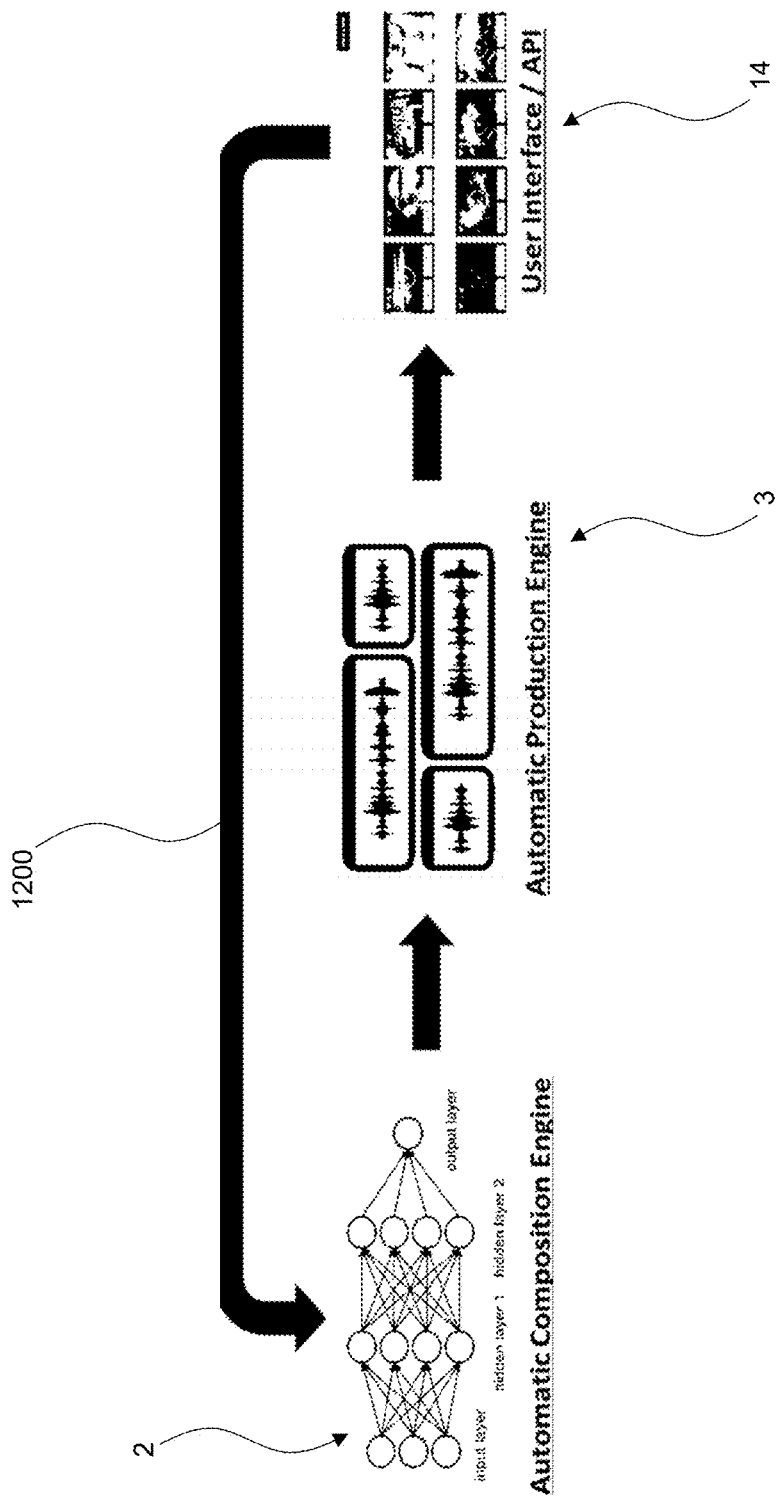
FIG. 12 shows an AI music production stack.

FIG. 12 shows a schematic function block diagram of the AI music production system, which is shown to comprise an automatic composition engine 2, an automatic production engine 3, and an access component in the form of an application programming interface (API) 14.

Automatic Music Composition Engine

The automatic music composition engine 2 performs the first step in generating music. Traditionally, AI-based composers have been either hard-coded, rule-based systems (which generally produce tracks that sound very similar to one another) or basic machine learning systems whose lack of complexity rendered them incapable of generating multifaceted, pleasing music that could be useful to users in any context.

By contrast, the composition engine 2 utilizes a novel neural network structure to enable its machine learning system to generate complex, well-structured, quality musical output. Among other things, this allows the system to:

Maximize the ability of musical parts to work well together—novel techniques ensure the system generates musical parts that interact with one another in musically convincing ways, significantly increasing the overall quality of the generated music.

Better understand the metrical context of musical choices—Other AI systems have difficulty with the long-term memory necessary for understanding the metrical context required when making compositional choices. However, the present technology has solved this problem, ensuring metrical context factors into each compositional choice, which increases the quality of the generated music.

Generate significantly varied output—By utilizing machine learning techniques in place of hard-coded rules, the composition engine 2 provides a musical output that better reflects the characteristics of the dataset on which it is trained. This means the output can be more varied as hard-coded rules inherently limit the range of output possibilities.

Automatic Music Production Engine

Whereas the automatic music composition engine 2 is responsible for composing music (in MIDI or other digital musical notation format), the automatic music production engine 3 is responsible for applying music production techniques to this composed music to create studio-quality audio tracks. The production engine 3 automatically assembles the output of the automatic music composition engine 2 into a fully arranged and produced song, which is then output to an audio file. It makes choices around which instruments and sounds to use for each musical part, and automatically renders, mixes and masters the audio in a sophisticated, cloud-based audio engine (denoted by reference numeral 12 in FIG. 1—see below). This allows a song to be automatically generated and produced according to a user's desired musical settings (such as genre, mood, and duration), thereby allowing users to create novel songs with no prior knowledge of musical concepts or music production techniques. The automated music production engine 3 has several key differentiating features, including:

A high performance, cloud-based audio engine—Most audio engines are designed to run on a local machine and be controlled via a user interface to manipulate audio. By contrast, the audio engine 12 of the Jukedeck system runs in the cloud and is designed to automatically produce audio with no user input. This means it can be utilized by a wide variety of applications and users, requires no expert musical knowledge, and is highly scalable.

The ability to affect what happens at specific points within a piece of music—Video creators almost always source music after they have finished creating their video. There are often certain points in a video that the creator would like to accentuate with the use of music. Points at which, for instance, the action is more or less intense, and the video will be more effective if the music matches. Existing methods of sourcing music for video generally do not allow users to set specific points at which certain events should happen in the music. By contrast, the present disclosure provides "sync point" and "intensity" features which in turn provide video creators with this functionality, making their video soundtracks more effective and cutting down on editing time.

Sync Point—The Jukedeck system allows users to set a sync point within their track to the nearest millisecond. That is, it allows for a specific musical event (such as a section change) to be positioned at a specific point in time within the track. This feature allows the piece of music to be synchronized with another piece of media (e.g. to some event happening in an accompanying video). The Jukedeck system is capable of setting multiple sync points at multiple different points of time within the audio track.

Intensity—The Jukedeck system allows users to specify the way in which the intensity of the music should change over the course of the track. A defined intensity curve maps to multiple properties of the sound, and further enables the generated music to be automatically shaped to fit an accompanying piece of media, allowing musical structures such as a build-up to a climax to happen at specific points in time.

This is not simply a case of allowing users to create a piece of music using inputs that affect the sound at specific points within the piece using pre-rendered audio stems; rather, Jukedeck's engine generates original audio in real-time in response to user input. Rendering the audio in real-time allows for far greater control over changes in the music throughout the process. While stem-based systems can only apply effects to the audio used to construct the song, the Jukedeck system is able to directly alter the notes which are being played, as well as change the sounds used for each musical sequence, before they go through any effects. This gives the system the potential to sound much more realistic when responding to a change in desired sync point or Intensity. For example, in a slow-motion video of a person diving into water, a sync point or intensity peak could be chosen to coincide with the point at which he or she hits the water, to create the effect of the music building up to that climax.

The ability to edit a previously generated audio track—Editability features ensure that any previously-generated audio track can be edited, and a new version can be created by requesting that it adhere to new high-level settings (such as a revised duration). This means users can automatically generate a revised version of a previously produced song that sounds similar to the original while incorporating the required edits. This allows users to quickly and efficiently change, for instance, the duration of any song without possessing any of the expert editing skill that would traditionally be required for this task.

Neural network-based audio synthesis—An extension of the technology is the ability to train a neural network to convert MIDI data into audio data without the need for third-party virtual instruments.

The ability to automatically arrange pre-rendered, human-composed audio stems—The architecture of the Jukedeck system is modular, which means the automatic music production engine 3 an also dynamically rearrange pre-rendered, human-composed audio stems—in place of output of the automatic music composition engine 2—for instances in which this functionality is required. This means the present technology can be used to fit pre-rendered audio stems to pieces of media in which precise sync points are required.

Application Programming Interface (API)

The API 14 enables third-party developers to incorporate the generation and customization of AI composed music—either audio or MIDI—directly into their own applications, in an app, a browser, or a mobile context.

A key feature of the described AI music production system is an application programming interface (API) that gives developers access to the full power of the AI composition and production system, allowing a user to automatically create professional quality, customised music at scale. A range of musical styles can be accessed at the click of a button.

The API is an API for audio and MIDI. That is, with the API a user can generate both audio files and their underlying compositions in MIDI format. Some of the possible options provided are summarized in the following table:

| Audio | MIDI |
| --- | --- |
| Select by style, tempo and duration | Select by style, tempo and duration |
| Choose from a pre-generated audio library or generate your own unique tracks | Generate full tracks |
| | Generate MIDI loops |
| | Control over key, time signature and more |
| Edit existing tracks | Edit existing tracks |
| MP3 and WAV output | MIDI output |

A broad range of applications can be powered using the audio and MIDI API, including video creation, games, music making, generating music to accompany visual or other content in a variety of contexts, podcasting and content automation.

Some of the benefits include the ability to: empower the user's creative experience with single-click, personalised music, increase user engagement with unique features, return a complete audio track to a platform with just a few lines of code and provide users with artificially created music that they are free to use without some of the customary restrictions associated with recorded music.

Figure 3:
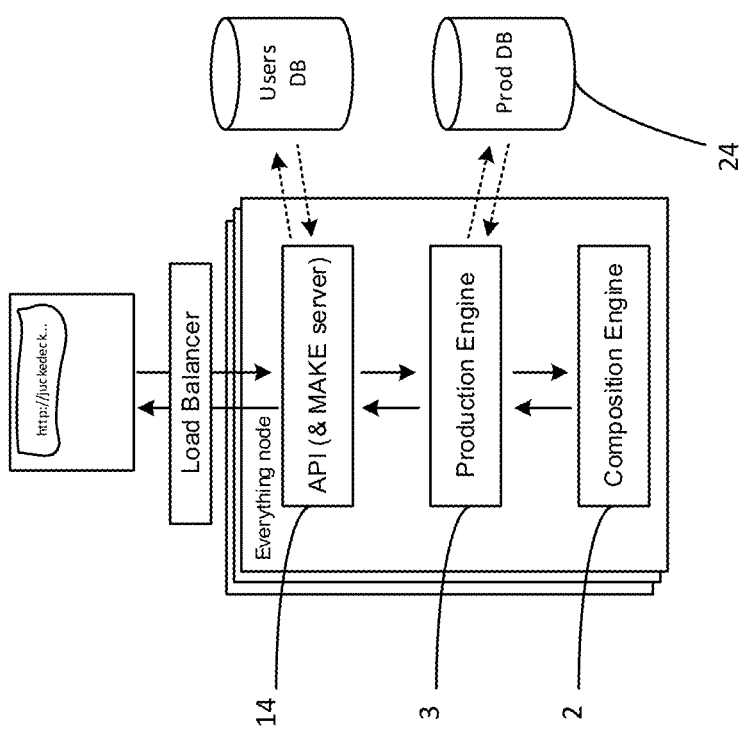
FIG. 3 shows a high level overview of a music production system with the core system components arranged in a stack.

FIG. 3 shows a block diagram of the AI music production system which gives a high-level overview of some of its core functions that are described in further detail later.

Herein the term artificial intelligence is used in a broad sense, and as such covers both machine learning (ML) and also expert (rules-based) systems which are not ML systems, as well as other forms of AI system that are neither ML nor expert systems. Although in the following, specific references are made to ML and expert systems, or combination above, the description applies equally to other forms of AI system.

The system is shown to comprise the composition engine 2 and the production engine 3, which broadly represent two core aspects of the system's functionality. These are shown arranged as layers in a stack, with the composition engine below the production engine to reflect their respective functions. Different possible structures of the stack are described later, but these all broadly follow this division between composition and production.

The composition engine 2 composes segments of music in a digital musical notation format. Herein a digital musical notation format means a digital representation of a musical score in computer-readable form. One such format is an event based format, where musical notes are indicated by events with a start time/stop time. Such notations are known. This can be a format in which musical notes are represented as a pitch value and associated timing data denoting the start and end time of the note (or viewed another way its start time and duration or "sustain"). The notes can be represented individually or as chords for example.

The pitch value is commonly quantised to musical half-tones, but this is not essential and the level of quantisation can depend on the type of music. Often other musical data will also be embodied in the format, such as a velocity or pitch modulation of each note. The velocity parameter traces back to acoustic instruments and generally corresponds intuitively to how hard a musical instrument, such as a piano or guitar, should be played. The format is such that it can be interpreted by a synthesiser (such as a virtual instrument), which in effect "plays" the score to create audio, by interpreting the various parameters according to its internal musical synthesis logic. One example of such a format is MIDI, which is a standardised and widely used way of representing scores, but the term applies more generally to other formats, including bespoke formats. The following refers to MIDI segments by way of example but the description applies equally to any other musical notation format. The composition engine preferably operates based on machine learning (ML) as described later.

Herein, the terms "music segment" and "musical segment" are synonymous and refer generally to any segment of music in digital musical notation format. Each segment can for example be musical bar, fraction of a bar (e.g. crotchet, quaver, semi-quaver length segments etc.) or a sequence of multiple bars depending on the context. A music segment can be a segment within a longer musical score. A musical score can be made up of multiple musical parts (corresponding to different performative voices e.g. vocal parts, instruments, left and right hand parts for a particular instrument etc.). In sheet music notation, each part is generally scored on a separate staff (although a chord part for example could be scored using chord symbols), and viewed from this perspective each music segment could correspond to a bar, a fraction of a bar or sequence of bars for one of the parts. This applies equally to MIDI segments, whereby a MIDI segment refers to a music segment in MIDI format. Whilst individual MIDI segments can be embodied in separate MIDI files or data streams, different MIDI segments can be embodied within the same MIDI file or data stream. It is also possible to embody MIDI segments for different musical parts within the same MIDI file or data stream, e.g. using different MIDI channels for different parts, as is known in the art. Accordingly, in the following description, MIDI loops and individual segments of a MIDI loop or part may both be referred to as music segments. It will be clear in context what is being referred to.

A core function of the production engine 3 is taking a set of one or more MIDI segments and converting them to audio data that can be played back. This is a complex process in which typically multiple virtual instruments and audio effects (reverb, delay, compression, distortion etc.) are carefully chosen to render different MIDI segments as individual audio data, which are "mixed" (combined) synergistically to form a final "track" having a desired overall musical and sonic effect or "soundscape" where the track is essentially a musical recording. The role of the production engine is analogous to that of a human music producer and the production engine can be configured based on expert human knowledge. However, in use, the production process is an entirely automated process driven by a comparatively small number of selected production parameters. The production engine is also an AI component, and can be implemented either as an expert (rules-based), non-ML system, an ML system or a combination of rules-based and ML processing.

One key service provided by the system is the creation of piece of music, in the form of an audio track (e.g. WAV, AIFF, mp3 etc.) "from scratch", which involves the composition creating MIDI segments that form the basis of the track that is produced by the production engine, by synthesising audio parts according to the MIDI segments that are then mixed in the manner outline above. This is referred to herein as a "full stack" service.

However, a benefit of the system architecture is its ability to offer individual parts of the functionality of the production engine or the composition engine as services.

One such service is referred to herein as "MIDI as a service" whereby a human producer can obtain ML-generated MIDI segments (e.g. loops) to which he can apply his own personal production methods, for example in a digital audio workstation (DAW). At its core, this is essentially offering the composition engine's functions as a standalone service although as will become apparent, depending on the way the system is implemented, this can draw on elements of the production engine (as explained later, the division between production and composition is implementation-specific to an extent). This is particularly useful for users with production skills but who lack composition skills or musical inspiration.

Another such service is "production as a service", whereby a composer can provide to the system MIDI segments that he has composed, where in this context it is the AI system that assumes the role of producer, creating a finished audio track from those MIDI segments. This offers the functions of the production engine as a standalone service and is essentially the opposite of MIDI as a service. Production as a service is particularly useful for composers who lack production skills or inclination.

All of the services can be accessed via the access component 14 in the form of an application programming interface (API), such as a web API, whereby API requests and responses are transmitted and received between an external device and an API server of the system via a computer network such as the Internet. The access component 14 comprises a computer interface to receive internal and external requests as described later.

Regarding the division between composition and production, although each of these has certain core, defining characteristics, there is some flexibility on where the line is drawn in terms of the system architecture. Ultimately, the system is structured in line with the musical principles according to which it operates.

In simple terms, the traditional process of music creation can be considered in the following stages:
1. Composition
2. Performance (or humanization)
3. Production Depending on the context, certain forms of composition can be broken up into two relatively distinct sub-stages:

element composition and arrangement. Here, element composition refers to the creation of the essential musical elements that make up a track, which are then arranged to create a piece of music with convincing long term structure. These can both fall within the remit of a composer, or they can be quite separate stages, and historically this has been dependent to a certain extent on the style of music. However, in other contexts composition and arrangement can essentially be performed as one. The term "composition" as it is used herein can refer to composition that incorporates arrangement or element composition depending on the context. Performance would traditionally be the elements of variation introduced by a human performer (such as timing/velocity variations etc.), and production the process of capturing that performance in a recording. Over time, however, the lines between these aspects have become more blurred, particularly with more modern electronic music that can be created with no more than minimal human performance, using MIDI sequencing and the like, leading to a greater emphasis being placed on production than performance in some instances. Nowadays, the term production can cover a broad range of things, such as balancing the levels of individual channels, equalization, dynamic control (compression, limiting etc.) and other audio effects (reverb, delay, distortion etc.), the selection of virtual instruments to generate audio for individual channels etc.

In terms of the implementation of the AI music production system, the composition, arrangement and performance functions can be implemented as essentially standalone functions of the production engine, which take MIDI segments from the composition engine, and arrange and humanise them respectively. For example, the MIDI segments could be short loops that are strictly time quantised to fractions (e.g. 1/16 or 1/32) of a bar. These can then be arranged (e.g. according to a verse-chorus type structure), and performance can be added by adding a degree of variation (temporal, velocity, pitch etc.) to approximate an imperfect human performance. With this approach, it can be convenient to implement these functions in the production engine, along with the MIDI processing performed as part of the final music production process.

However, an equally viable approach would be to amalgamate one or both of these functions with the composition itself, whereby the ML-composition engine is trained to compose music with convincing long term structure and possibly humanisation, within the composition engine.

Thus arrangement and performance can be implemented in the production engine, the composition engine or a combination of both.

In a practical context the architecture of the system will to some extent reflect the approach that is taken to musical composition and arrangement.

It is noted that humanisation in particular is an optional component, and may not be desirable for every type of music (e.g. certain styles of electronica).

Composition Engine:

A possible structure of the composition engine 2 is described below. First certain underlying principles that feed into the design of the composition engine 2 are discussed.

A Probabilistic Sequence Model (PSM) is a component which determines a probability distribution over sequences of values or items. This distribution can either be learned from a dataset of example sequences or fixed a priori, e.g. by a domain expert. By choosing an appropriate dataset or encoding suitable expert knowledge, a PSM can be made to reflect typical temporal structures in the domain of interest, for example, typical chord or note sequences in music.

A PSM can be used to generate sequences according to its distribution by sampling one item at a time from the implied probability distribution over possible next items given a prefix of items sampled so far. That is, each item is selected according to a probability distribution of possible items that is generated by the PSM based on one or more of the items that have been chosen already. In the context of the composition engine, the items are music segments, which may for example correspond to a fraction of a bar (e.g. 1/16, 1/32 etc.) at the level of the composition engine but which can be segments of any length depending on how the PSM is configured. Each music segment can for example correspond to an individual note or chord at a particular point in the sequence.

The probability distribution provides a set of candidate music segments (notes, chords etc.) for selection for a sequence—based on one or more music segments that have already been selected for the sequence—and an associated probability value for each candidate music segment, which defines how likely that music segment is to be selected as the next music segment in the sequence. Because the output is probabilistic, this introduces an element of variation whereby the same composition settings can give rise to different compositions (as described below, an additional probabilistic element can also be introduced in selecting the composition settings themselves).

Examples of PSMs include Markov chains, probabilistic grammars, and recurrent neural networks with a probabilistic final layer (SOFTMAX etc.).

A Composition Engine (CE) is a system which is able to turn a small number of composition parameters into either a complete musical score or a shorter section of music, possibly with an arbitrary number of parts. A part is understood to be a division of musical material between performative voices, which can then be rendered in distinct ways. This distinction is fundamental in the practice of music production; for example, different musical instruments and spatial parameters can be assigned to each part in order to simulate a physical musical performance.

It may be possible to build a relatively basic composition engine that can provide multiple parts with a single PSM, such as a neural network. That is, by building a single PSM over a complete moment-by-moment description of all aspects of a multi-part composition. Such an approach is viable, however with more complex composition this may necessitate some internal compromises to simplify the model and make it workable. Whilst this may be sufficient in some contexts, other approaches may be beneficial when it comes to more complex and intricate composition.

Accordingly, depending on the level of complexity, it may be appropriate to divide the task between multiple PSMs, each of which has a specialised role, such as focusing on a particular combination of attributes, or a particular kind of part. In that case an important modelling decision is how specific each PSM's scope should be. Bringing together a loosely coupled collection of PSMs in a modular approach has the potential for great flexibility in how individual requests to the CE can be serviced.

Using the technology described below, it is possible to coordinate each PSM to work coherently with the others, without limiting the capabilities of any individual PSM. That is, these principles provide a solution to the problem of sharing information between multiple PSMs in a flexible way. The main elements of this technology can be summarized as follows:

1. A modular extensible system for working with musical attributes such that they can form part of the input to or output from a PSM.
2. Multiple PSMs responsible for modelling restricted combinations of attributes and/or parts.
3. A mechanism to condition the events sampled from a PSM on attributes produced by another or from an external constraint.

These will now be described in detail.

1. A Modular Extensible System for Working with Musical Attributes Such that they can Form Part of the Input to or Output from a PSM.

A musical event is a complex object that can be described in terms of a potentially unbounded number of aspects or attributes pertaining to the event, including intrinsic properties such as pitch, duration, vibrato etc., but also the event's relationships with its context, such the underlying harmony, its position in time, whether a note is higher or lower than the previous note, etc. Focusing on a limited number of these "viewpoints" allows a PSM to focus on capturing the probabilistic structure in certain aspects of musical sequences (in order to obtain a tractable model) whilst leaving others to be dealt with by some other system. Two PSMs can be coordinated by sharing one or more viewpoints; for example values for a viewpoint can be generated from one PSM and fed in as constraints on the sampling space from the other. This vastly reduces the complexity of the modelling problem. A modular approach to working with viewpoints means that PSMs can easily be created to model arbitrary combinations of viewpoints, whilst ensuring consistent coordination between the PSMs, both during training and generation.

2. Having Multiple PSMs Responsible for Modelling Restricted Combinations of Attributes and/or Parts.

A "divide and conquer" approach to solving the complex composition problem is to provide specialised PSMs for particular musical attributes (in particular styles). E.g., one PSM may specialise in producing chord symbols with durations, and another might specialise in chord symbols and melody note pitches and durations. This means that each PSM can focus on modelling its combination of attributes accurately, leading to high-quality, musically convincing output. The loose coupling of PSMs means that they can be used freely in combinations chosen at the point of servicing a composition request, allowing the system to be flexible in the choice of numbers and kinds of parts that can be generated for one composition.

3. Ability to Condition the Events Sampled from a PSM on Attributes Produced by Another.

Certain PSMs can be used in a way which allow the outputs of one to be the (perhaps partial) inputs of another. For example, A PSM over melody notes with chord symbols could be conditioned to match the chord symbol produced by a different PSM. This promotes coherence between parts, and allows the composition engine 2 to take advantage of the modularity of the multiple PSM approach without sacrificing musical quality.

Figure 4:
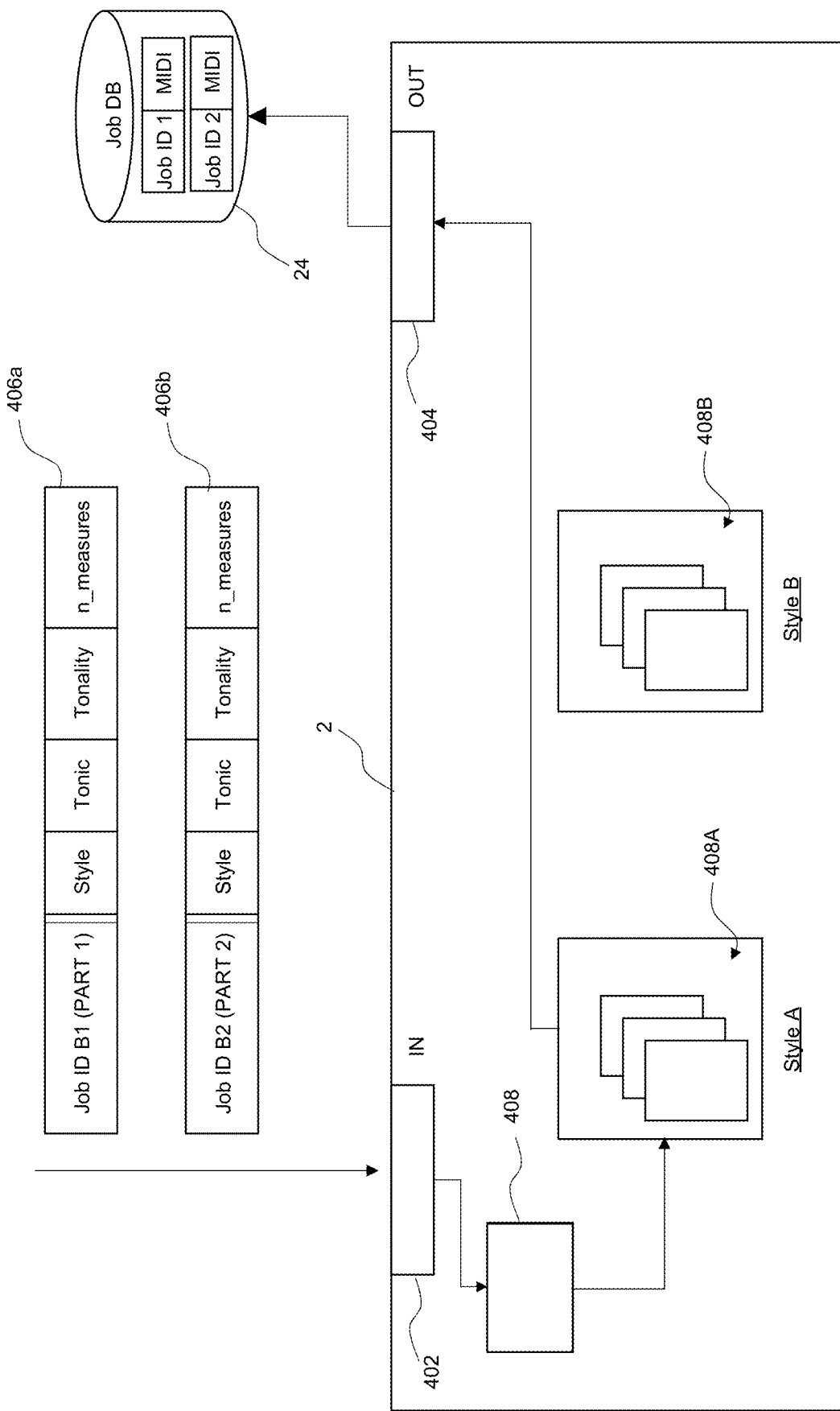
FIG. 4 shows a schematic block diagram of a composition engine.

FIG. 4 shows further details of one possible configuration of the composition engine 2 according to the principles set out above. In this case, the task is divided between multiple neural networks but these could be other forms of PSM as indicated.

The composition engine 2 is shown having an input 402 and an output 404, which are an internal input and output respectively. The composition engine input 402 is configured to receive requests for MIDI segments, each having a job identifier (ID) assigned as described below.

A key function of the composition engine is generating musically cooperating music segments for different musical parts, which are structured to be performed simultaneously to create a coherent piece of music. The MIDI segments can be midi "loops" which can be looped (repeated) in order to build up a more complex track. If different MIDI loops are provided for different musical parts, these can be looped simultaneously to achieve the effect of the parts playing together. Alternatively, multiple parts can be captured in a single MIDI loop. However, the principles can be extended such that the composition engine 2 provides longer sections of music, and even a complete section of music for each part that spans the duration of the track.

Music segment(s) for multiple musical parts can be requested in a single job request. Where different passages of music are requested separately (e.g. verse and chorus), these can be requested by separate job requests, though the possibility of requesting such passages of music in a single job request (e.g. requesting verse and chorus together) is also viable. These job request(s) correspond to the job requests of FIG. 2 (described below), but are labelled 406a, 406b in FIG. 4. Note that these job requests could be received directly from an external input of the access component (see FIG. 1, below), or be received as an internal job request as explained with reference to FIG. 2. Each job request comprises the job ID and a set of musical composition parameters, which in this example are:

| Field Name | Type | Description |
| --- | --- | --- |
| n_measures | Number | Length in measures (bars) of the MIDI loop to generate - either 1, 2, 4, or 8 |
| style | String | Musical style: One of a predetermined set of possible styles [e.g. piano, folk, rock, cinematic, pop, chillout, corporate, drum_and_bass, ambient, synth_pop] |
| tonic | Number | Musical tonic (key): [0 – 11], with 0 = C |
| tonality | String | One of [natural_major, natural_minor] |

As noted, not all of these composition parameters are essential, and other different types of composition parameter can be defined in different implementations. A key aspect of the system is that a user is able to define the style they want (alternatively the system can select the style autonomously where it is not specified—see below), and the composition engine 2 can provide compositions in different styles according to the architecture described later.

The composition layer 2 is shown to comprise a plurality of composition modules, labelled 408A and 408B. Each composition module is in the form of a trained neural network, each of which has been trained on quite specific types of musical training data such that it can generate music in a particular style. In the following examples the composition modules are referred to as networks, but the description applies equally to other forms of ML or PSM composition module.

The composition parameters in each job request 406a, 406b are used both to select an appropriate one of the networks 408A, 408B and also as inputs to the selected network. In this example, each of the predetermined styles is associated with a respective plurality of networks. By way of example, FIG. 4 shows the first networks 408A associated with a first style (Style A) and the second networks 408B associated with a second style (Style B).

Within each style group 408A, 408B, suitable networks can be selected for the task at hand. As will be appreciated, the manner in which networks are selected will depend on how those networks have been optimised in accordance with the principles set out above.

For each job request 406a, 406b, a composition controller 408 of the composition engine 2 selects an appropriate subset of the networks to service that job request. The network subset is selected on the basis that is associated with the musical style specified in the job request.

As noted, multiple parts—such as chords and melody—can be requested in the same job request. This applies both to internal and external requests to the composition engine 2.

Once generated, the MIDI segment(s) generated in response to each job request 506a, 506b are stored in a job database (24, FIG. 1) in association with the assigned job ID. Alternatively, MIDI segments could be stored in a separate database and all description pertaining to the job database in this context applies equally to the separate database in that event.

Figure 5:
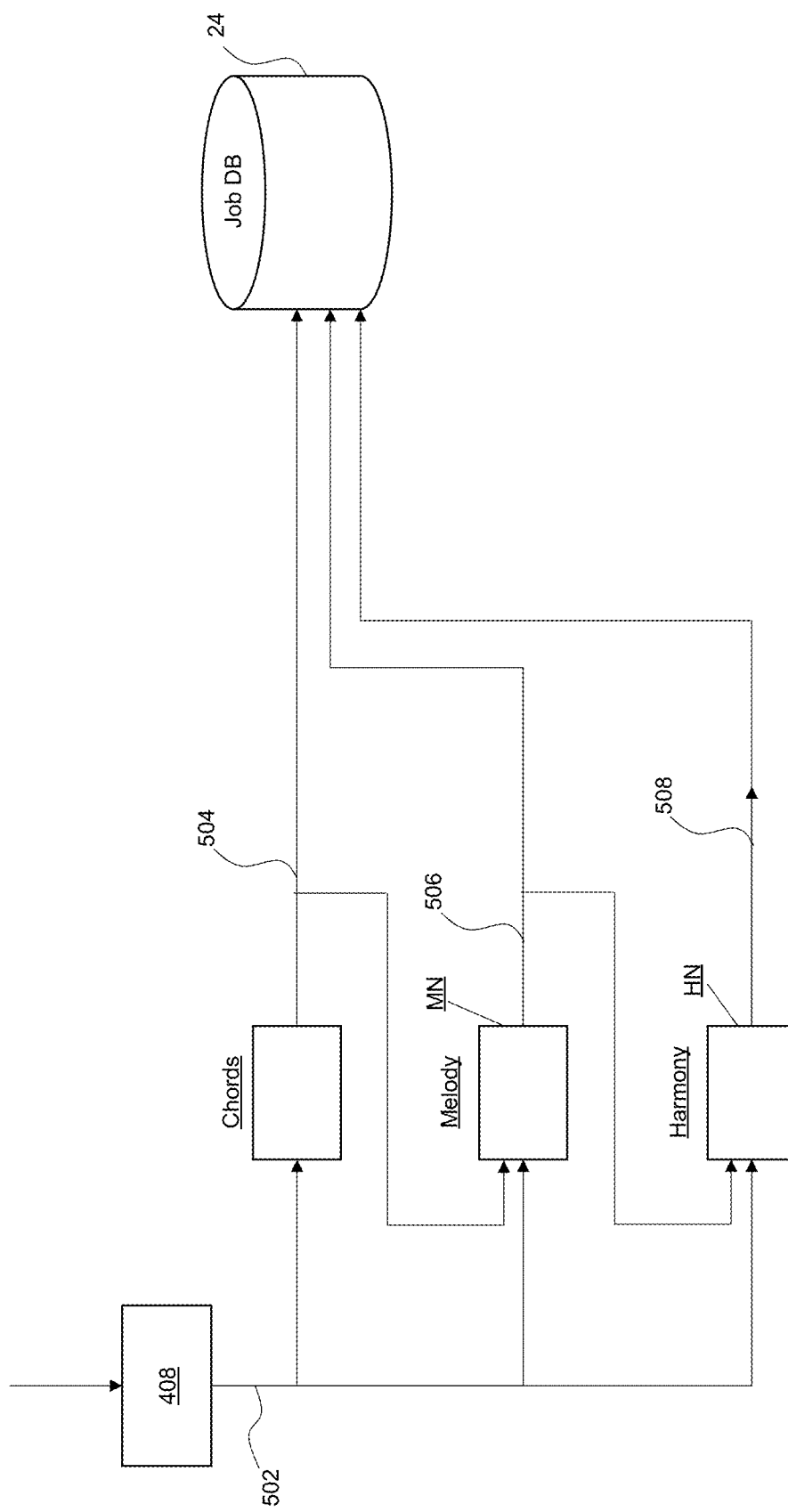
FIG. 5 illustrates one example architecture of a composition engine for generating music segments for multiple musical parts.

With reference to FIG. 5, networks associated with a particular style cooperate to produce a plurality of musically cooperating elements. This is achieved by providing outputs of the networks as input to other networks in a hierarchical relationship.

To illustrate this underlying principle, FIG. 5 shows three networks associated with Style A: chord (CN), melody (MN) and harmony (HN), which correspond to the first networks 408A in FIG. 4.

In this example, each of the networks CN, MN and HN is shown configured to receive as inputs composition parameters 502 determined by the composition controller 408 of the composition engine 2 in the manner described above. Although shown as the same input, the network need not receive exactly the same parameters, and each can receive different selections of the composition parameters for example.

The chords network CN is configured to generate a chord sequence (progression) 504 based on the parameters 502. This need not be MIDI, and could for example be a symbolic chord representation, but it may be convenient (though not essential) to convert it to MIDI for subsequent processing. The generated chord sequence is stored in the job database in association with the applicable job D.

In addition, the melody network MN receives, as input, the generated chord sequence 504 and generates a melody 506 based on the chord sequence 504 and the composition settings 502, to accompany the chord sequence in a musical fashion. That is, the melody 506 is built around the chord progression 504 in the musical sense. The generated melody 506 is also stored in the job database 24 in association with the applicable job ID.

In addition, the melody 506 is inputted to the harmony network HN. The harmony network HN generates, based on the composition settings 502 and the melody 506, a harmony 508 which it outputs as a MIDI segment, which is a harmonization of the melody 506 in the musical sense. Although not shown in FIG. 5, it may be appropriate for the harmonization network HN to also receive the chord sequence 504 as input, so that is can harmonize the melody 506 and also fit the harmony 508 to the chord sequence 504.

The generated harmony 508 is also stored in the job database 24 in association with the applicable job ID.

The chord sequence 504, melody 506 and harmony 508 can be requested in the same job request, and in that event are stored together in the job database 24 in association with the same job ID.

The output of each network can be, but need not be MIDI—it could be some other digital musical notation format, such as a bespoke format (see above). It may be convenient, where the output is not MIDI, to convert it to MIDI later, but this is not essential.

Networks can also take, as input, external MIDI, such as a user-generated or library MIDI segment and compose around this.

Another example of input that a network can compose to is percussion, which can be user or ML generated. Here, the percussion can for example drive the rhythm of the composed segments, or the emphasis that is placed on certain notes (where emphasis/velocity is handled at the composition engine 2).

Figure 1:
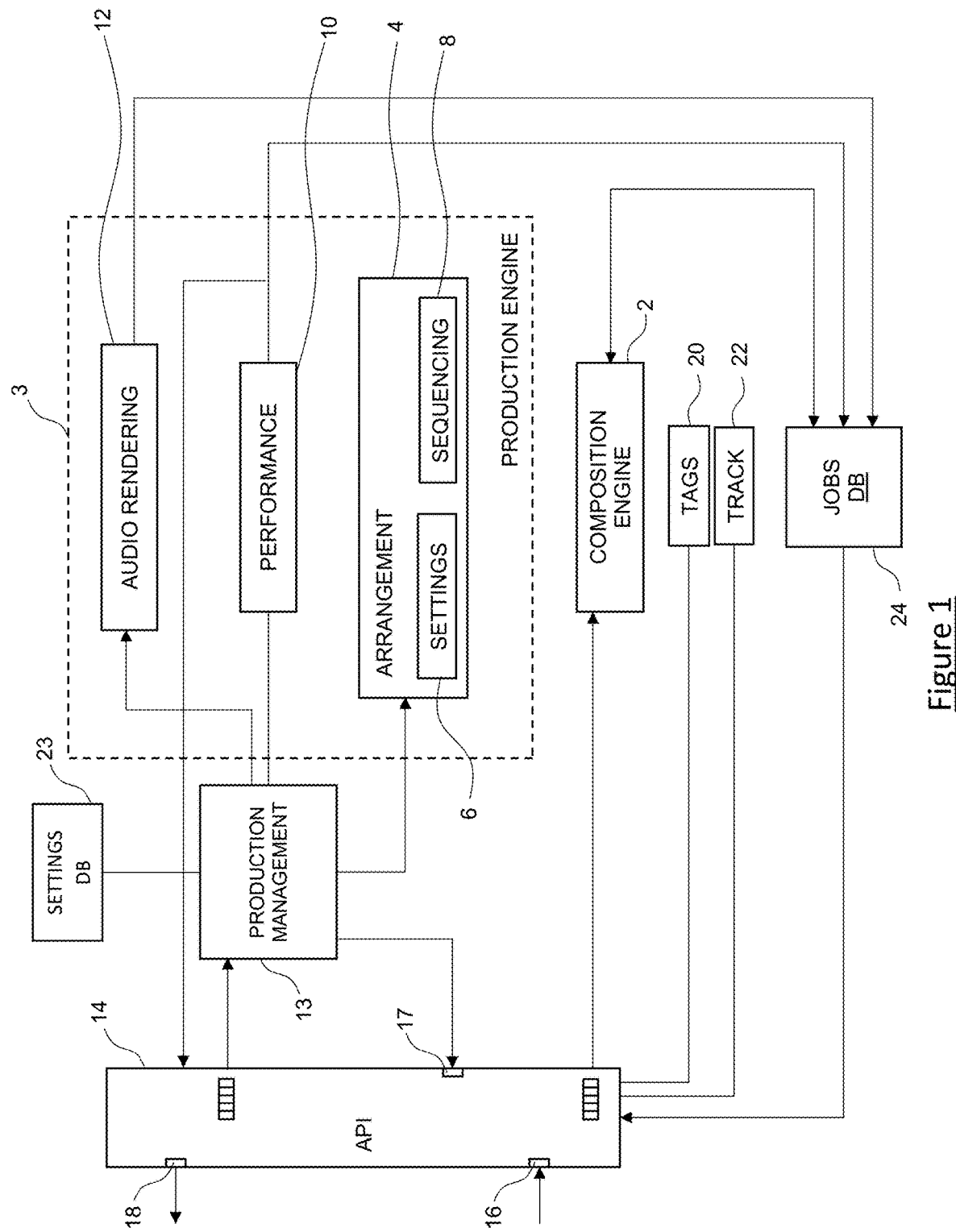
FIG. 1 shows a schematic block diagram of a music production system.

Full Stack:

FIG. 1 is a schematic block diagram illustrating one possible configuration of the music production system. The music production system is organised into four layers or components. It will be evident from the following that there may be some overlap between functionality of the individual layers or components, but the following description illustrates clearly how the generation of a piece of music is organised in the music production system. The music production system operates to receive a group of settings, which will be described in more detail later, and generates a piece of music. In the following, a piece of music is referred to as a 'track', but it will be understood that the system can produce music of any length/character. The track may be generated as a musical score in a digital musical score notation, such as MIDI, or in audio. Where score formats other than MIDI are used it may be convenient (but not essential) to convert it to MIDI for later processing. For this reason a conversion layer (not shown) may be provided within the system which converts a notation score into MIDI. It will be appreciated that this conversion layer could form part of the composition engine itself or could form part of another layer in the system that could receive a score and convert to MIDI for the purpose of using MIDI.

A production management component (controller) 13 manages the layers of the system in the manner described below. The controller 13 handles both internal and external requests, and instigates functions at one or more of the layers as needed in order to service each request.

Reference numeral 2 denotes the composition engine. The composition engine operates to receive a group of settings, which will be described in more detail later, and generates MIDI segments to be arranged and produced into a track. It generates segments of music in a symbolic format, to be arranged and produced into a track. It uses a collection of PSMs to generate the segments of music. These PSMs have been trained on datasets of music tracks chosen to exemplify a particular musical style. The composition engine determines which PSMs to employ on the basis of the input settings.

Reference numeral 4 denotes an arrangement layer. The arrangement layer has the job of arranging the MIDI segments, produced by the composition engine 2 into a musical arrangement. The arrangement layer can be considered to operate in two phases. In a first phase, it receives arrangement parameters which will be described later and produces from those parameters a musical arrangement as an envelope defining timing and required sequences etc. The arrangement functionality of the arrangement layer is marked 6. This envelope defines the musical arrangement of a piece. As will be described in more detail later, these settings can be used to request MIDI segments from the composition engine 2, through the production manager. A second phase of the arrangement layer is the sequencing function 8. According to the sequencing function, MIDI segments are sequenced according to the arrangement envelope into a finished piece of music. The MIDI segment may be provided by the composition engine (as mentioned earlier), or may be accessed from a pre-existing library of suitable MIDI segments, which can be generated in advance by the composition engine 2. The production management component 13 may for example check the library to see if suitable pre-existing MIDI is available, and if not instigate a request to the composition engine 2 to generate suitable MIDI. Alternatively, the library check can be performed at the composition engine 2 in response to a request, or alternatively the library check can be omitted altogether. Further, MIDI segments may be introduced by an external user as will be described in more detail later. The arrangement layer 4 provides an arranged piece of music in MIDI form. In some situations, this 'raw' piece of music might be suitable for some purposes. However, in those circumstances, it will not be playable in any useful form. Therefore, a performance layer 10 is provided which adds performance quality structure to the piece of music produced by the arrangement layer 4.

There is a decision tree in the arrangement section which operates based on incoming settings. This decision tree embodies human expertise, namely that of a human music producer. The arrangement layer generates a musical arrangement structure using the settings, which has a set of time sequenced sections for which it then requests MIDI from the composition engine (or elsewhere, e.g. from a library), and which in turn are sequenced according to the arrangement structure.

It is noted again that this is this is just one example of how long-form structure can be created for a piece of music. As an alternative to this separate arrangement layer, that operates 'agnostically' of the MIDI to be sequenced, arrangement could be handled as part of the composition itself, in the composition engine 2.

The performance layer outputs a performance quality piece of music in MIDI. There are many applications where this is useful. However, similarly, there are other applications where an audio version of the piece of music is required. For this, an audio rendering layer 12 (audio engine) is provided which outputs a performance quality piece of music rendered in audio.

The conversion or rendering of a piece of music MIDI to audio can be done in a number of different ways, and will not be described further as these include ways that are known in the art.

As noted, the music production engine has an access component 14 which can be implemented in the form of an API (application programming interface). This access component enables communication within the music production system (in particular, the production management component 13 can communicate with the composition engine 2 via the access component 14—see below), and also enables functionality to be provided to external users. For the sake of illustration, the side of the access component 14 facing the music production system will be considered to be responsible for internal routing between the layers via the production management component, whereas the side facing away will be responsible for inputs and outputs from an external user. It will be appreciated that this is entirely diagrammatic and that the API could be implemented in any suitable way. As is known in the art, an API is implemented using a piece of software executing on a processor within the API to implement the functions of the API.

The API has at least one external input 16 for receiving job requests from an external user and at least one external output 18 for returning completed jobs to an external user. In addition, in some embodiments, the API enables communication between the internal layers of the music production system as will be described.

Jobs which can be requested at the input 16 include the following.

A request for tags can be input by a user which retrieves a list of tags which are usable in providing settings to create a musical track. Tags include musical styles such as piano, folk et cetera. A full list of tags is given below by way of example only. Tags are held in a tags store 20. Such a request can also be used to request settings that are useable within the system if desired.

Different types of tag can be defined, such as mood and genre tags. Examples of genre tags include: Piano, Folk, Rock, Ambient, Cinematic, Pop, Chillout, Corporate, Drum and Bass, Synth Pop. Example of mood tags include: Uplifting, Melancholic, Dark, Angry, Sparse, Meditative, Sci-fi, Action, Emotive, Easy listening, Tech, Aggressive, Tropical, Atmospheric. It may be that the system is configured such that only certain combinations of genre and mood tags are permitted, but this is a design choice. Note that this is not an exhaustive list of tags—any suitable set of tags can be used as will become apparent in due course when the role of the tags in selecting composition and production settings within the system is described.

A library query can be provided at the input 16, the library query generates a search to a paginated list of audio library tracks which are held in a tracks store 22, or alternatively in the jobs database 24. These can be stored in an editable format which is described later. These are tracks which have been already created by the music production system or uploaded to the library from some other place. They are stored in a fashion which renders them suitable for later editing, as will be described in the track production process.

The library query for tracks returns the following parameters:

Job ID—this is a unique identity of a track which has been identified, and in particular is the unique ID allowing the track to be edited Tags—these are tags associated with the track identifying the style Assets—this denotes the type of asset, i.e. MIDI or WAF Duration—this denotes the length of the piece of music. In song creation, the length of a piece of music is generally around 3 minutes. However, pieces of music may be generated for a number of purposes and may have any suitable duration.

As will be appreciated, these are just examples, and the request can return different parameters in different implementations.

The input 16 can also take requests to create jobs. The jobs can be of different types.

A first type of job is to create an audio track. To achieve this job, the user may supply a number of audio track create settings which include:

Musical style

Duration—the length of the track

One or more tag—defining the style of the track

Tempo—the musical tempo of the track

Sync points—any particular place where there is to be a concentration of intensity in the track or other events, such as specific instrument entries at specific points or any other events that lend musical character to the track.

Intensity curve—generalization of sync points that allows desired intensity variations in the track to be defined with greater flexibility as a curve over time.

Note that not all of these parameters are required. The system is capable of making some autonomous decisions based on minimal information. For example, the system is capable of creating an audio track if it is just supplied with the duration. The production management component 13 itself will determine tags, tempo and sync points in that event. In fact, the system is capable of generating a track with no input settings—any of the settings can be selected autonomously by the system if they are not provided in the track request.

The production management component can also generate settings for one or more than one of the layers based on the musical style. When generating a complete track this involves generating, based on the style, both audio production parameters for the audio production engine 3 and composition parameters for the composition engine 2, as described in more detail below.

In the following, certain parameters may be referred to as required. As will be appreciated, this simply refers to one possible implementation in which these parameters are made required parameters as a design choice. There is however no fundamental requirement for any of the parameters to be provided by a user, as it is always possible to configure the system to autonomously select any desired parameter that is not provided by a user.

A second type of job is to request a MIDI track to be created. This job also requires the input of at least duration, and optionally at least one tag, tempo and sync points.

Alternatively, duration can also be an optional parameter and the system can select a duration autonomously if none is provided.

A request for an audio track involves use of all of the components of the music production system, including the audio rendering layer to produce a track rendered in audio. In this example, a request to create a MIDI track uses the composition engine, the arrangement layer and performance layer to produce a track in MIDI. It does not use the audio rendering layer. As noted, the arrangement layer and performance layer are optional components and the system can be implemented without these. For example, the composition engine 2 can be configured to generate fully-arranged MIDI with humanization where desired.

Track production is described later.

A third type of request is to edit an existing audio track. Tracks are stored in a track library identified by unique job identifiers, in the manner described below. A user must supply the ID of the job to edit. Note that this could be achieved by carrying out the library query mentioned earlier in order to identify the correct job ID for the track that is needed to be edited. The user can provide a new duration for the track. Optionally, the tempo and sync points can be defined. The output of this is a new version of the existing track, edited as defined by the new settings. Alternatively, the existing duration can be used if the user does not which to change the duration and wishes to edit some other aspect(s) of the track (or the system could even be configured to select a duration autonomously if none is provided but a change of duration is nonetheless desired). The system is able to handle edit requests because sufficient information about the decisions made by the system at every stage is stored in the job database 24 against the track ID as described below.

The system may also be equipped to handle requests to edit a MIDI track as described later. These can be handled in much the same way as audio track edit requests, but the resulting output is MIDI rather than audio.

A fourth job is to create a MIDI loop. This is a job carried out by the composition engine and can take in a different set of parameters to the other jobs. It has as a minimum to receive the lengths in measures of the MIDI loop to generate (either 1, 2, 4 or 8—though this is just an example). Alternatively, length can be an optional parameter and the system can select a length autonomously if none is provided. In addition, styles may be specified, for example one of piano, folk, rock, cinematic, pop, chill out, corporate, drum and bass, ambient, synth pop. These can be specified as tags in the above sense. The tonic number can be provided [0—11], with 0=C, and/or the tonality can be provided as one of natural_major and natural_minor for example. As will be described later, the composition engine is capable of generating MIDI loops according to such parameters. In addition, an enable parameter can be provided which turns on velocity, timing and humanisation of the MIDI. Alternatively separate parameters can be provided to allow these to be enabled/disabled independently.

A similar job is to create an audio loop. This is similar to a MIDI loop request, but involves the production engine. This can be achieved by the production engine requesting a MIDI loop(s), which it then causes to be rendered to provide loopable audio.

Figure 9:
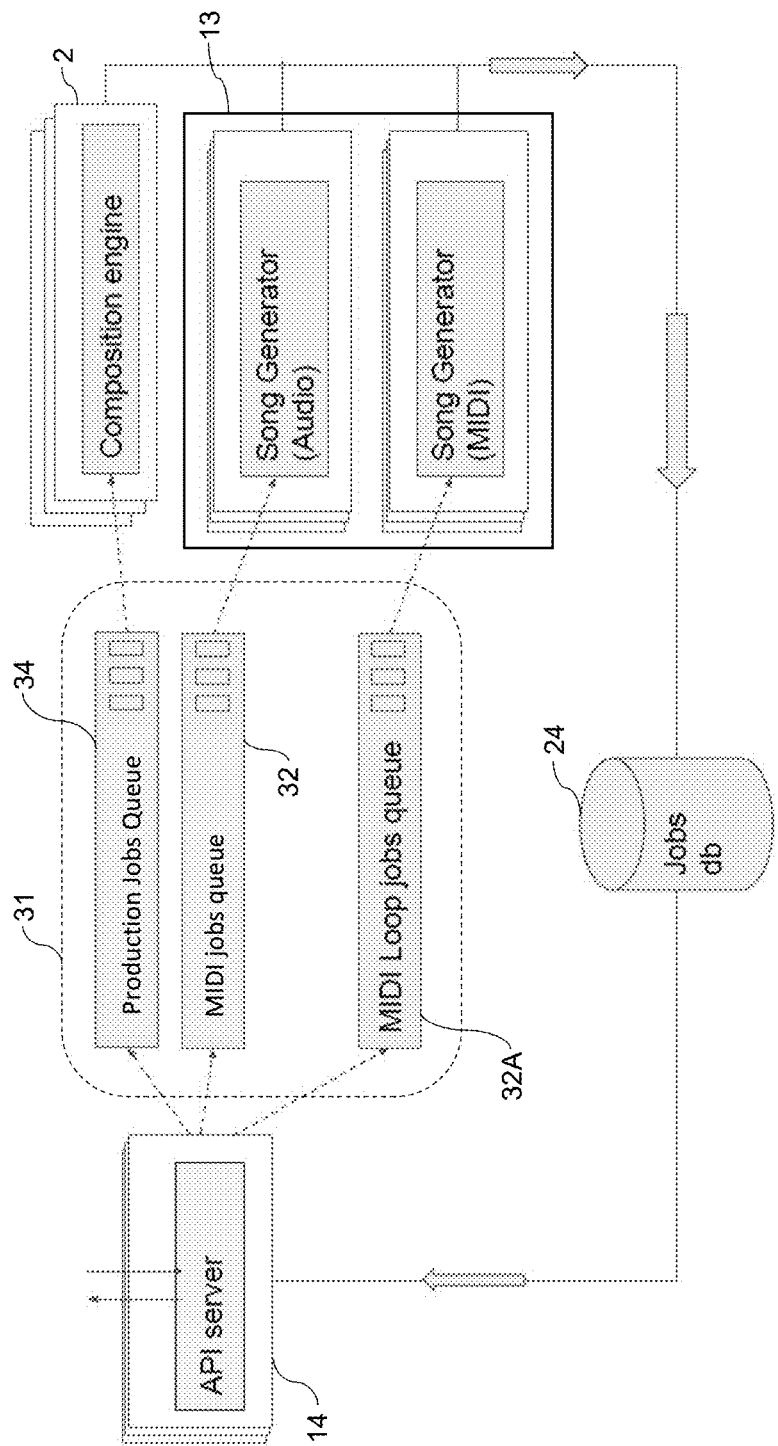
FIG. 9 shows a schematic block diagram of one part of a music composition system.

FIG. 9 shows one example of an architecture for implementing the API 14. A key feature of the API 14 in this architecture is that it can handle both internal and external job requests in the same way. That is, both job requests originating outside of the music production system and job requests instigated by a component of the system itself that are directed to other components of the system. A particular example of this is the "MIDI as a service" function provided by the composition engine 2, which is available both to an external user but also to components of the system itself, such as the production manager 13.

Each incoming request at the API 14, whether internal or external, is assigned to one of a number of job queues 31 depending on the type of the request. In this example, a composition job queue 34 is shown coupled to the composition engine 2. A production job queue 32 and a MIDI job queue 32A are shown coupled to the production management component 13. These two queues 32, 32A are provided for holding different types of request that are handled by the production management component 13. Jobs allocated to the production job queue 32 relate to audio tracks involving the audio engine 12, whereas jobs allocated to the MIDI jobs queue 32A relate to MIDI and do not involve the audio engine 12. That is, the production management component can handle both audio and MIDI requests.

Certain types of request 'bypass' the production engine 3 and production management component 13 and are allocated to the composition job queue 34 for processing by the composition engine 2, without the involvement of the production engine 3 or production management component 13. Such requests can originate from an external device or from the production management component 13.

Requests that are to be serviced by the production management component 13, such as a request for a whole track or a request to edit a track (see below) are allocated to the production job queue 32 in the case of audio and the MIDI job queue 32A in the case of MIDI for processing by the production management component 13. As described in further detail later, such a request received at the production management component 13 can result in the production management component 13 instigating one or more internal requests of its own to the composition engine 2 via the same API 14, which in turn are allocated to the composition job queue 34 for processing by the composition engine 2.

Although not shown in FIG. 9, it can be convenient to provide a separate jobs queue for each type of request the API 14 can handle. Accordingly, there may in fact be multiple audio-type job queues (e.g. audio creation and audio editing) and multiple MIDI-type job queues (e.g. MIDI creation and MIDI editing) coupled to the production management component 13.

Figure 2:
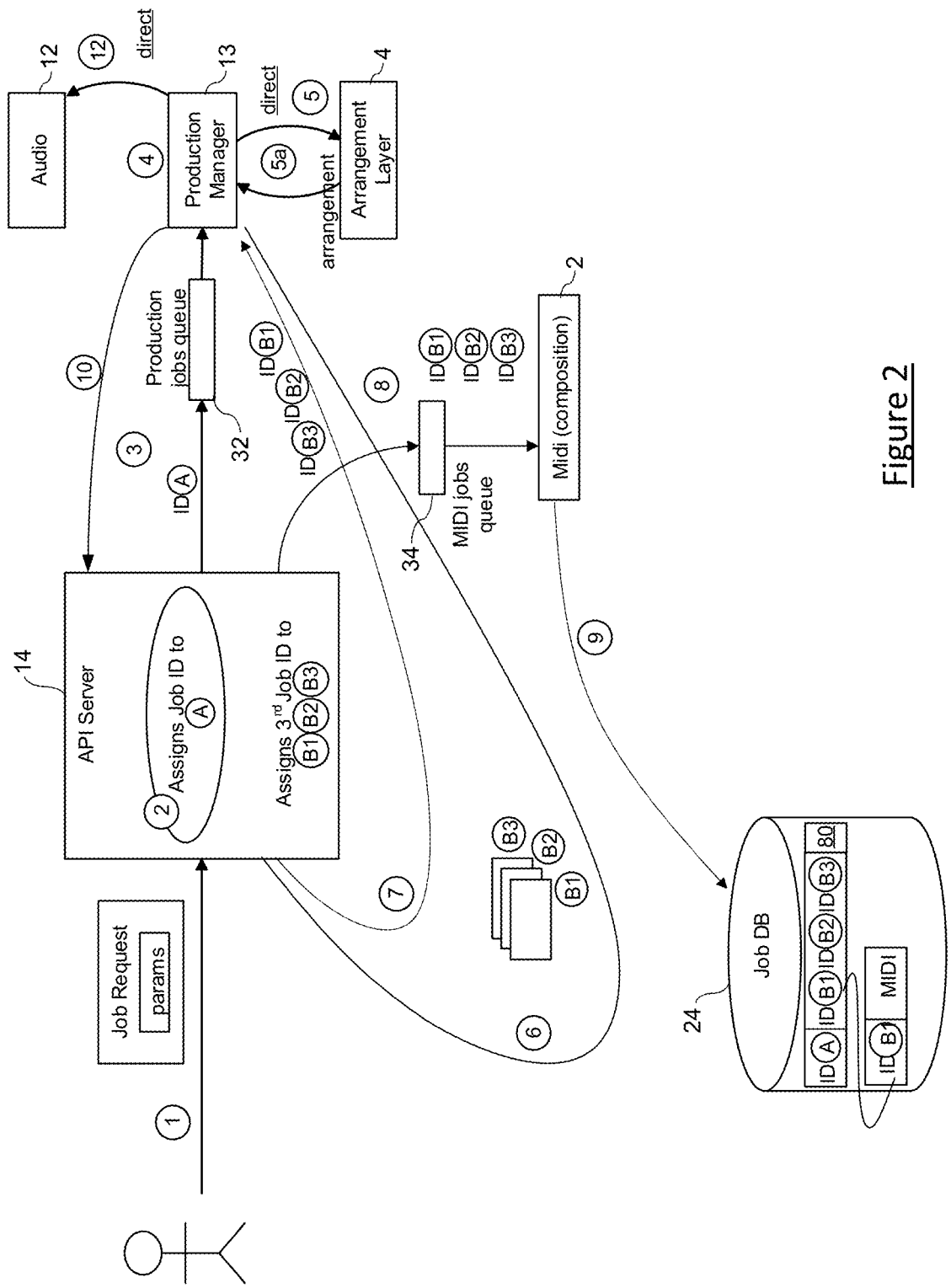
FIG. 2 shows how an incoming job request may be handled by a music production system.

A track creation task will now be described with reference to FIG. 2. In FIG. 2, numbers in circles represent steps of a method, and are distinct from reference numerals denoting particular elements of the structure. Elements of the structure shown in FIG. 2 correspond to those discussed in FIG. 1 and are marked with reference numeral corresponding to that in FIG. 1.

A human user can provide a job request 30 in step 1 at the input 16 of the API 14. The job request 30 can in principle be any of the job types which have been described above, but the present part of the description relates to creation of an audio track or MIDI track. The job request 30 defines at least one parameter for defining the creation of those tracks, as described above. Alternatively, as noted, the job request 30 may define no parameters, and all parameters may in that event be selected autonomously by the system. At step 2, within the API 14, a job identifier is assigned to the job request 30. This is referred to herein as ID A. The job is then assigned to the production job queue 32 which is associated with the production manager 13. The allocation of the job ID A to the production queue is denoted by step 3.

At step 4, the production manager operates to produce a track. The production manager 13 has access to the arrangement layer 4, the performance layer 10 and the audio rendering layer 12. Note that in FIG. 2 the performance layer is not shown separately but is considered to be available to the production manager as needed. The production manager 13 operates in association with the arrangement layer 4 according to an artificial intelligence model embodied in the production layer. This can be embodied by a decision tree which incorporates human expertise and knowledge to guide the production layer through production of a track, however other implementations are possible. For example, as noted already, the production engine can be implemented using ML. This decision tree causes the production manager 13 to access the arrangement layer 4 as indicated at step 5. The arrangement layer 4 operates to provide a musical arrangement which consists of at least timing and desired time signature (number of beats in a bar) and returns an arrangement envelope to the production manager 13 as shown in step 5a. The production manager 13 is then activated to request MIDI segments which will be sequenced into the arrangement provided by the arrangement layer 4. As indicated above, this is just one possible implementation that is described by way of example. In particular, as noted above, the system can be implemented without one or both of the arrangement layer 4 and performance layer 8, with the functions of these layers when desired handled elsewhere in the system, e.g. incorporated into the operation of the composition engine 2. This request can also be applied through an API input, referred to herein as the internal API input 17. For example, the production manager 13 can generate a plurality of MIDI job requests; for example these are shown in FIG. 2 labelled B1, B2, B3 respectively. Each of the MIDI job requests are applied to the internal input 17 of the API 14. The API 14 assigns job identifiers to the MIDI job requests, indicated as ID B1, ID B2 and ID B3 and these jobs labelled with the unique identifiers are supplied to the MIDI jobs queue 34 in step 8. The identifiers are returned to the production manager 13. This is shown by step 7.

The jobs with their unique identifiers are assigned to the composition engine 2 which can generate using artificial intelligence/machine learning individual MIDI segments. The composition engine has been trained as described above.

The composition engine 2 outputs MIDI segments as indicated at step 9 into the job database 24. The MIDI segments could be stored in a separate database or could be stored in the same job database as other completed jobs to be described. Each MIDI segment is stored in association with its unique identifier so that it can be recalled. The production manager 13 periodically polls the API 14 to see whether or not the jobs identified by ID B1, ID B2 and ID B3 have been completed as described in the next paragraph. This is shown at step 10. When they are ready for access, they are returned to the production manager 13 who can supply them to the arrangement layer for sequencing as described above. The sequenced segments are returned via the production manager 13 either to an output (when a MIDI track is desired), or to the audio rendering layer 12 (step 12) when an audio track is required.

Assigning job IDs in this way has various benefits. Because the job ID is assigned to a request when that request is received, a response to that request comprising the job ID can be returned immediately by the API 14 to the source of the request, before the request has actually been actioned (which depending on the nature of the request could take several seconds or more particularly in the case of audio). For example, a request for audio or MIDI can be returned before the audio or MIDI has actually been generated or retrieved. The source of the request can then use the returned job ID to query the system (repeatedly if necessary) as to whether the requested data (e.g. audio or MIDI) is ready, and when ready the system can return the requested data in response. This avoids the need to keep connections open whilst the request is processed which has benefits in terms of reliability and security.

Audio Engine:

There now follows a description of how audio is rendered in the music production system described herein. Reference is made to FIGS. 1 and 2. A request for an audio track is one of the job types mentioned above which can be received at the input 16 of the API 14. In this context, the API provides a computer interface for receiving a request for an audio track. In this connection, an audio track is an audio rendered piece of music of any appropriate length. It is assumed that it is a completed piece of music in the sense that it can be rendered in audio data and listened to as a complete musical composition. The incoming request is assigned a Job ID. As mentioned above, the request can include one or more parameter for creating an audio track. Note that, as also mentioned before, it is possible to request a track without supplying any track creation parameters, in which case the system can use a default track creation process, involving for example default parameters. Such default parameters would be produced at the production management component 13 responsive to the request at the input 16. For example, a default duration may be preconfigured at 90s. Other default lengths are possible. Based on the request, multiple musical parts are determined. These may be determined at the production management component 13 based on input parameters in the request supplied at the input 16, or from parameters generated by the production management component. Alternatively, the musical parts may be provided in the request itself by the user making the request. In this case, musical parts may be extracted from the request by the production management component 13. This provides the music production system with extensive flexibility. That is, it can either work with no input from a user, or with many constraints supplied by a user, including track creation parameters and/or musical parts. The determination of musical parts is shown in step S602. Audio production settings are also generated from the request. This is shown in step S603. Note that step S602 and S603 could be carried out in sequence or in parallel. They may be carried out by the production management component, or any suitable component within the music production system.

The audio production settings and musical parts are supplied to the audio rendering component, at step S604. In addition, a sequence of musical segments in digital musical notation format is supplied to the audio rendering component. This sequence is generated by the composition engine or obtained elsewhere and is in the form of MIDI segments. These MIDI segments can be generated as described earlier in the present description, although they do not need to be generated in this way. Furthermore, it will be appreciated that an arranged sequence of MIDI segments could be supplied to the audio rendering component 12. This arranged sequence could be derived from the arrangement component 4 as described earlier, or could be an arranged sequence generated by a combined composition and arrangement engine. Alternatively, an arranged MIDI sequence could be provided by the user who made the audio track request.

The audio rendering component 12 uses the audio production settings, the musical parts and the MIDI sequence to render audio data of an audio track at step S605. At step S606, the audio track is returned to the user who made the request through the output port 18 of the API component.

A more detailed description will now be given a step 603 in which the audio production settings are chosen. The production management component 13 uses one or more tags to access a database of settings labelled 23 in FIG. 1. The tag or tags may be defined in the request which is input at the input 16, or may be generated by the production management component from information in the input request, or generated autonomously at the production management component.

Figure 7:
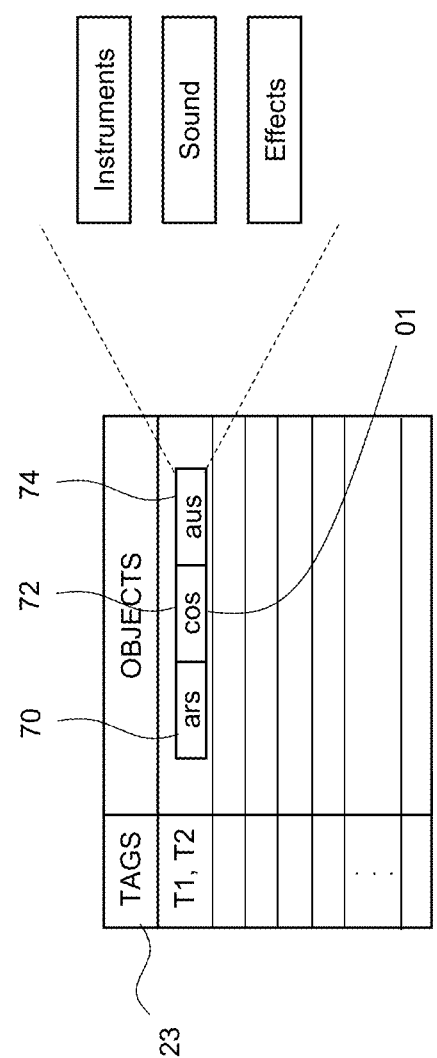
FIG. 7 shows a schematic illustration of a possible structure of a settings database.

For example, if a style parameter is defined in the request, tags appropriate to that style parameter can be requested from the tags database 20. Alternatively, one or more tag may be selected at random by the production component 13. The structure of the database of settings 23 is shown in FIG. 7. The database 23 is queryable using tags, because each arrangement settings database object is associated with one or more of the tags. There is no limit to the number of tags which may be associated with a single arrangement settings object. The database of arrangement settings objects can be queried by providing one or multiple tags and returning all arrangement settings objects which are marked with all of the provided tags. An arrangement settings object O1 is shown in the database 23 associated with tags T1 and T2, but the object O1 can be associated with any number of tags. Each arrangement settings object comprises three groups of settings. There is a group of arrangements setting 70, a group of composition settings 72 and a group of audio settings 74. This is just an example and there can be more or fewer groups of settings. As will be appreciated, the grouping of the settings reflects the architecture of the system, which can be designed flexibly as noted. For example, arrangement settings 70 may be incorporated in the composition settings 72 where arrangement is handled as part of composition.

Figure 8:
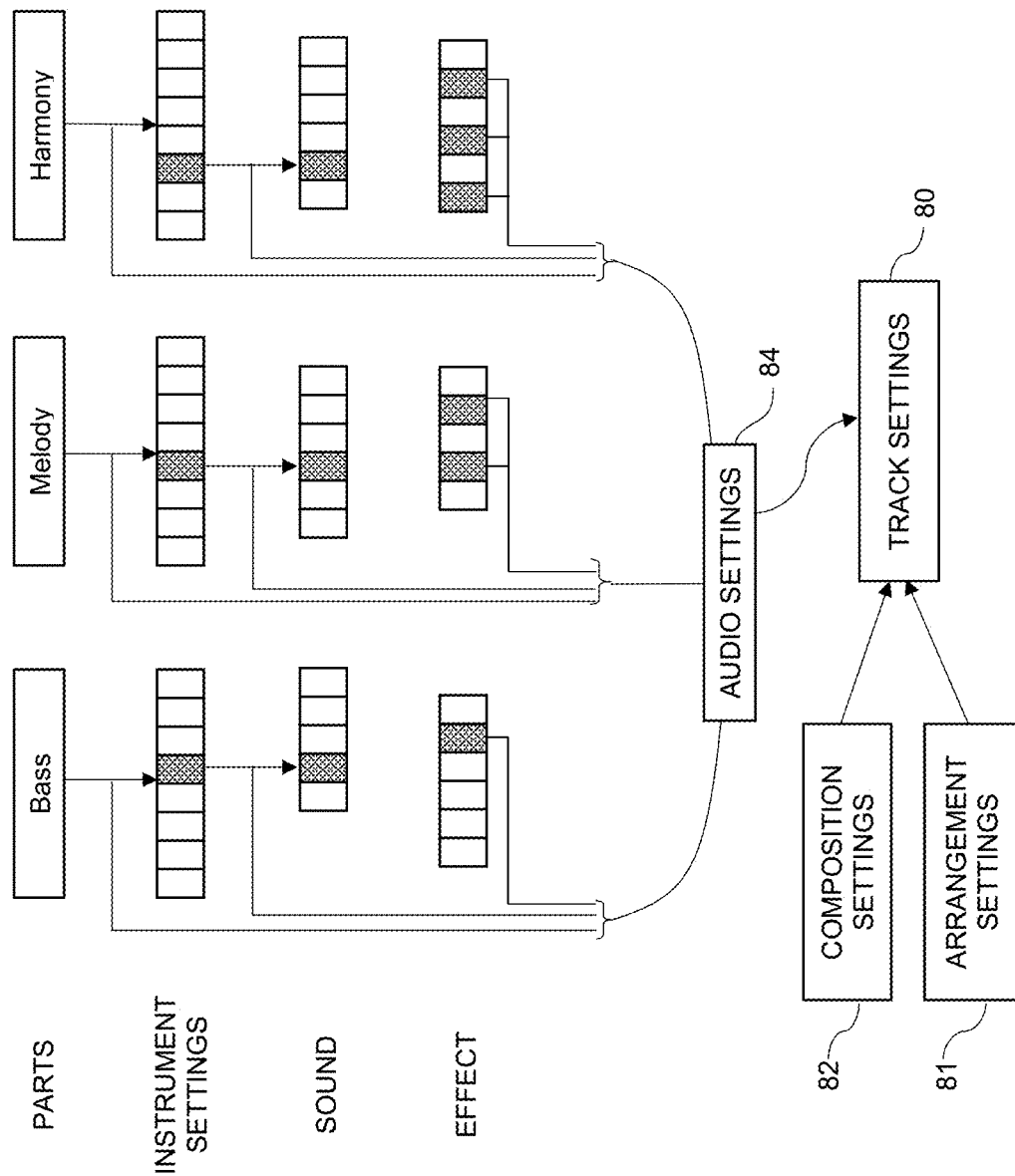
FIG. 8 illustrates a hierarchical selection mechanism for selecting track settings.

The groups have been defined to co-operate in a finished musical piece in accordance with the style indicated by the tag(s). As described already, tags can define such things as genre/mood/instruments. The settings recalled by the production management components 13 from the settings database 23 are used to control production of the music. A particular collection of settings can be selected from each group for each musical part, or one or more of the settings may apply to multiple musical parts. Reference is made to FIG. 8 to show the selection flow for audio production. An instrument is selected for each part from the group of audio settings for the particular tag or tags. This is denoted by crosshatching in FIG. 8. One way of selecting the instrument for each part is to select it randomly from the group of settings appropriate to that part. Within the audio settings there may be a category of settings associated with each part, for example bass, melody, harmony et cetera.

A particular sound for the instrument is chosen by selecting a setting from a group of sound settings. This selection may be at random. One or more audio effects may be selected for each sound. Once again, this may be selected at random from a group of audio effects appropriate to the particular sound. In order to implement these selections, the production management component 13 uses a decision tree in which knowledge about the suitability of particular instruments for particular parts, particular sounds, for particular instruments and particular audio effects has been embedded.

The term "sound" in this context means a virtual instrument preset. Virtual instrument is a term of art and means a software synthesiser, and a virtual instrument preset refers to a particular virtual instrument preferably together with a set of one or more settings for configuring that virtual instrument. The virtual instrument preset defines a particular virtual instrument and the timbre or sonic qualities of the virtual instrument. Different virtual instrument presets can relate to the same or different virtual instruments. E.g. for a virtual instrument which emulates a piano, there might be a preset which makes the virtual instrument sound like a grand piano, and another which makes it sound like an upright piano. It is these presets that the system selects between when choosing the sound for an instrument. It can be convenient to bundle the settings that make up a virtual instrument present into a single file.

The composition settings associated with the tag can be supplied to the composition engine 2 for controlling the output of MIDI segments to incorporate into the track. The arrangements settings 70 associated with the tag can be applied to the arrangement layer 4 for use in determining how the MIDI segments from the composition engine should be arranged as governed by the tag.

Finished tracks are stored in the job database 24 in connection with the job ID that was assigned to the incoming request.

Figure 6:
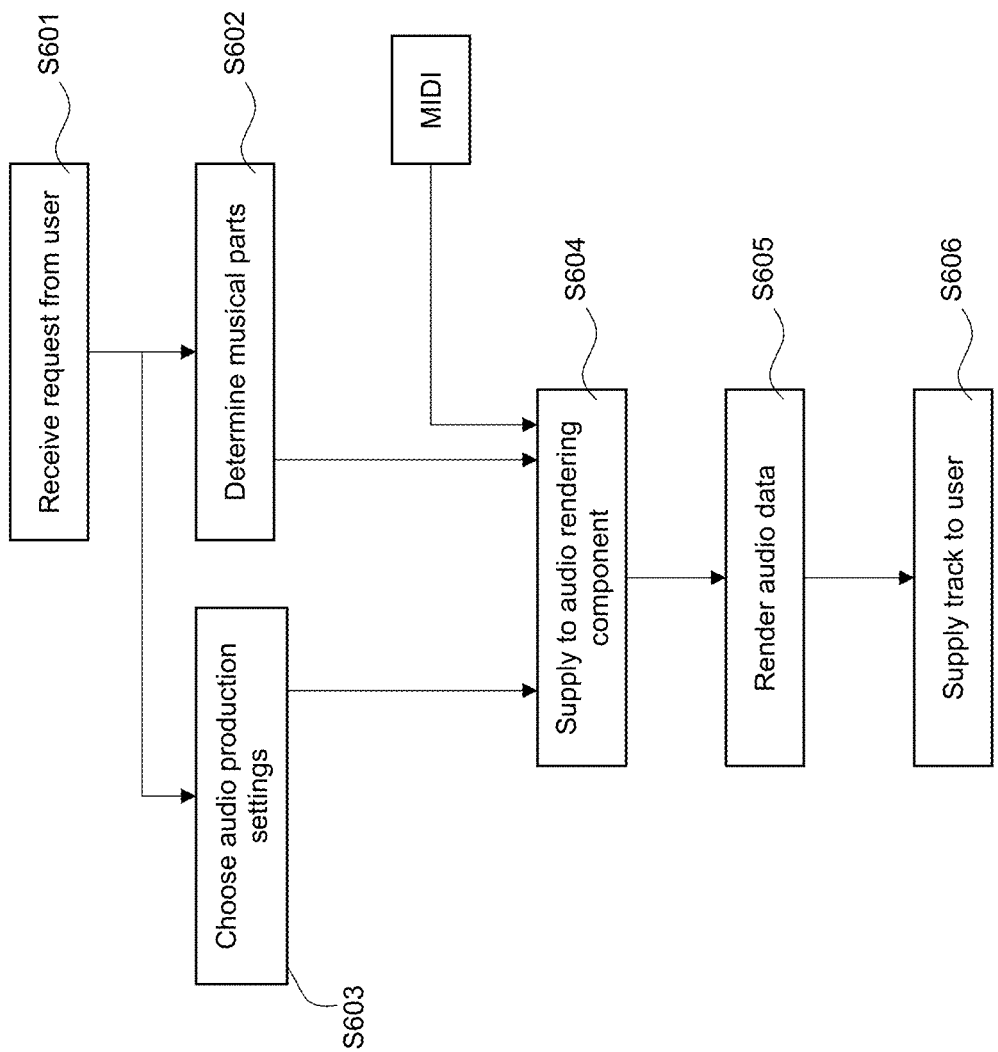
FIG. 6 shows a flow chart for a method of generating a track in response to a request from a user.

The track may be stored in terms of the settings (track settings 80) which were selected to generate it, along with the sequenced MIDI and/or the un-sequenced MIDI loop(s) or other segment(s) output from the composition engine 2, instead of as the audio data itself. Then, this sequenced MIDI can be supplied to the audio rendering component 12 with the musical parts and the selected audio production settings (as in step S604 of the flow of FIG. 6) to regenerate the track. The track settings 80 are made up of not only the selected audio settings, but also the composition settings and arrangement settings. That is to say, the track settings 80 contain all of the choices made by the production management component 13 and thus all of the settings needed to completely reproduce a track. In order to reproduce an identical track, these stored track settings 80 can be used at step S604 in FIG. 6 to create a duplicate track. In this context, the track settings 80 are referred to as reproducibility settings.

Returning to FIG. 2, in the context of a request for a track, the assigned job ID (ID A) constitutes an identifier of the track. The track settings 80 are stored in the job database 24 in association with the track identifier ID A. In addition, the identifiers ID B1, ID B2 and ID B3 are stored in the job database 24 in association with the track identifier IDA such that the pieces of MIDI used to build the track can be retrieved using the track identifier ID A. These can be sequenced or un-sequenced MIDI segments, or a combination of both. The information stored in the job database 24 in association with ID A is sufficiently comprehensive that the track can be reproduced using that information at a later time.

An example process for editing an existing track will now be described with reference to FIG. 11, which shows an edit request 52 being received at the API 14 in step S1102. The edit request 52 is shown to comprise a job ID 54 of a track to be edited and at least one new setting 56 according to which the track should be edited. An edit request is in effect a request to create a brand new track, but doing so using at least one of the settings and/or MIDI segments that were used to generate an earlier track. The track being edited can be an audio track or a MIDI track. At step of S1104, a response 59 to the edit request 52 is returned to a source of the request 52. The response 59 comprises a job ID 58 which is a job ID assigned to the edit request 52 itself. Note that this job ID 58 of the edit request 52 itself is different to the job ID 54 of the track to be edited, which was assigned to an earlier request that caused that track to be created (this earlier request could have been a request to create the track from scratch or could itself have been a request to edit an existing track). At step S1106 the edit request 52 is provided to the production management component 13 in the manner described above. Using the job ID 54 of the track to be edited, the production manager 13 queries (S1108) the job database 24 using the job ID 54 in order to retrieve the track settings 80 associated with the job ID 54, which it receives at step S1110. Where the track settings 80 comprise one or more references to MIDI segments used to create the track these can also be retrieved by the production manager 13 if needed. As noted, such references can be in the form of job IDs where the MIDI segments are stored in the jobs database 24 or they can be references to a separate database in which the MIDI segments are held. From this point, the method proceeds in the same way as described with reference to FIG. 6 but for the fact that the track settings used to create the edited version of the track are a combination of one or more of the track settings 80 retrieved from the job database 24 and the one or more new settings 56 provided in the edit request 52.

One example of a new setting 56 is a track duration, which a user can provide if he wants to create a longer or shorter version of an existing track. In a simple case, all of the original track settings 80 can be used to create the edited version of the track, along with the original MIDI segments, but with the original duration substituted for the new duration. Alternatively, new MIDI segments could be composed that are more suitable for the new duration, which involves an internal request to the composition engine 2. This is just a simple example and more complex track editing is envisaged. Note that, although in the example of FIG. 11, the one more new settings 56 are provided in the edit request 52, in a more complex scenario the production manager 13 may in fact select such new setting(s) 56 itself in response to the edit request 52, for example by selecting additional settings based on a setting indicated in the edit request 52 or by selecting new setting(s) autonomously by some other means.

Figure 11:
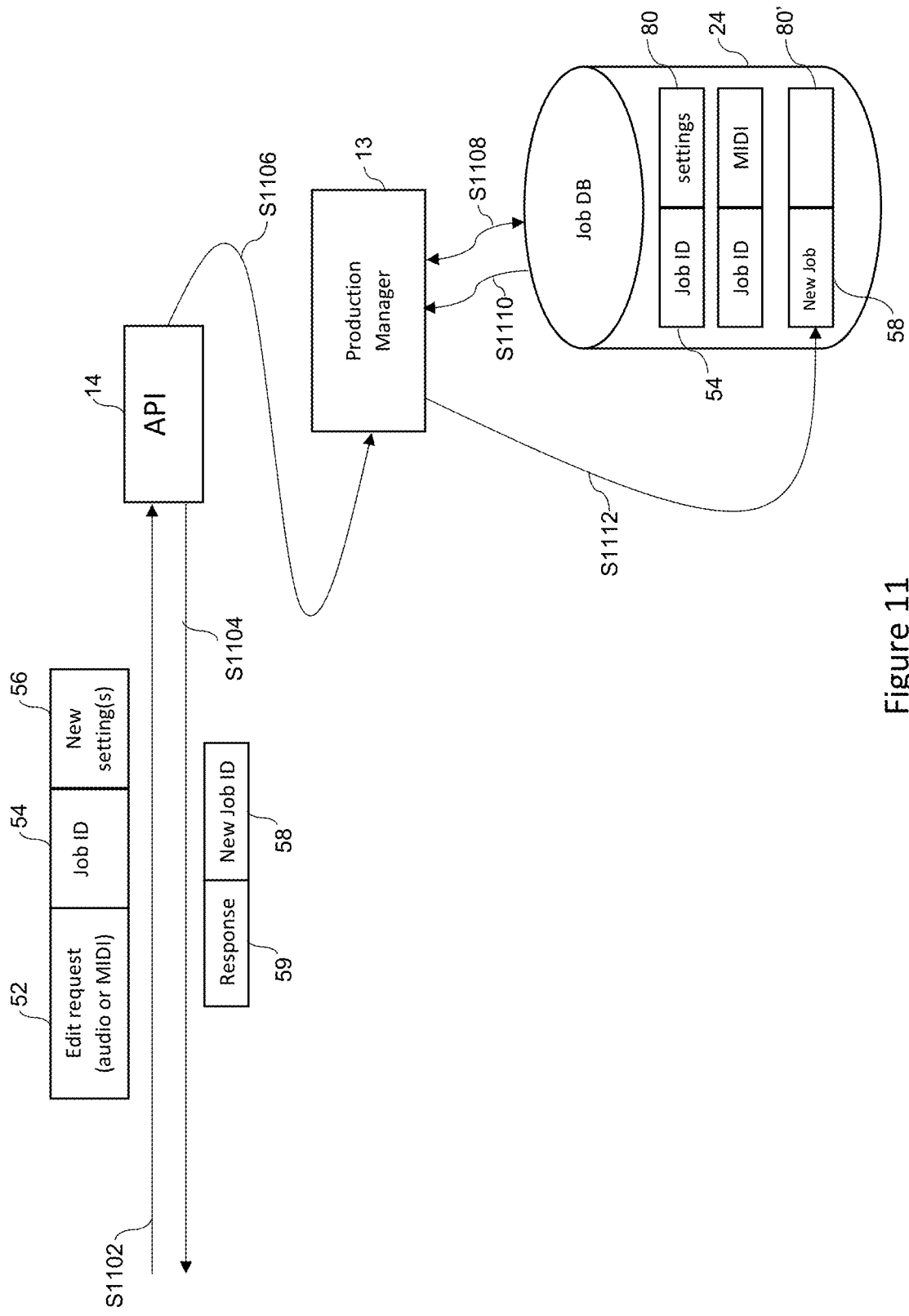
FIG. 11 shows a flow diagram illustrating a method of editing a musical track.

As shown at step S1112 in FIG. 11, the job ID 58 assigned to the edit request 52 is stored in the job database 24 in the same way as for other requests along with the track settings for the edited track which are labelled 80'. The track settings 80' are the settings that have been used to generate the edited version of the track and as noted these are made up of a combination of one or more of the original track settings 80 with the new setting(s) 56 determined in response to the edit request 52 in the manner described above.

The various components referred to above and in particular the production management component 13, the production engine 3 (that is, the audio rendering component 12, the performance component 10 and the arrangement component 4) and the composition engine 2 are functional components of the system that are implemented in software. That is, the composition system comprises one or more processing units—such as general purpose CPUs, special purpose processing units such as GPUs or other specialized processing hardware, or a combination of general and special purpose processing hardware—configured to execute computer-readable instructions (code) which cause the one or more processing units to implement the functionality of each component described herein. Specialized processing hardware such as GPUs may be particularly appropriate for implementing certain parts of the ML functionality of the composition engine 2 and the other components also when those are implemented using ML. The processing unit(s) can be embodied in a computer device or network of cooperating computer devices, such as a server or network of servers.

Figure 10:
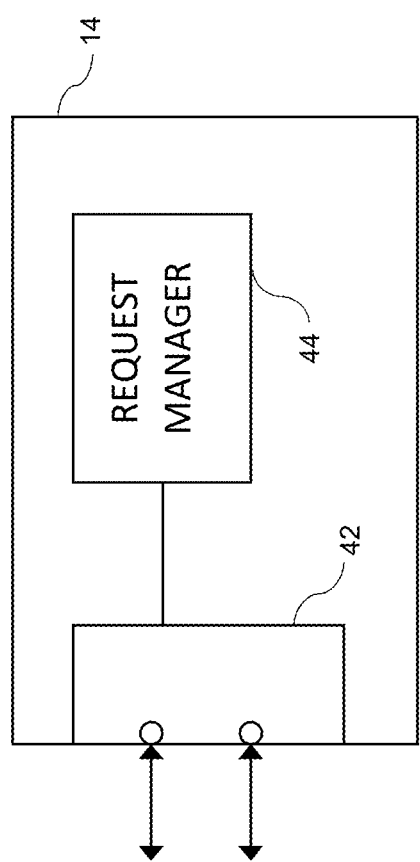
FIG. 10 shows a schematic block diagram of an application programming interface.

FIG. 10 shows a schematic block diagram illustrating some of the structure of the API 14, which is shown to comprise a computer interface 42 and a request manager 44 coupled to the computer interface 42. The request manager 44 manages the requests received at the computer interface 42 as described above. In particular, the request manager 44 allocates each request to an appropriate one of the job queues 31 and assigns a unique job identifier (ID) to each request (both internal and external). The job IDs service various purposes which are described later. The API 14 can be implemented as a server (API server) or server pool. For the latter, the request manager 42 can be realized as a pool of servers and the computer interface 42 can be provided at least in part by a load balancer which receives requests on behalf of the server pool and allocates each request to one of the servers of the server pool 44, which in turn allocates it to the appropriate job queue. More generally, the API 14 is in the form of at least one computer device (such as a service) and any associated hardware configured to perform the API functions described herein. The computer interface 42 represents the combination of hardware and software that sends and received requests, and the request manager 44 represents the combination of hardware and software that manages those requests. Requests are directed to a network address of the computer interface, such as a URL or URI associated therewith. The API 14 can be a Web API, with at least one Web address provided for this purpose. One or multiple such network addresses can be provided for receiving incoming requests.

Learning Automatically from Feedback

The system incorporates machine learning (ML) components such as neural networks, for example in the composition engine 2 as described later. These are trainable components which can learn from feedback that is provided as users engage with the system.

The underlying technology takes advantage of an efficient feedback loop denoted in FIG. 12 by reference numeral 1200: the more that users interact with Jukedeck's AI software to create, listen to, alter and ultimately download audio tracks, the more accomplished at composing music the ML components become as the user data is fed back into the system. The ability to harness this user data allows the underlying technology to be improved continuously based on user interactions.

Accordingly, at least one of the components of the Jukedeck system, such as the composition engine 2 or production engine 3, may be configured to adapt its operation based on information collected from users of the system. This information can be collected from a variety of sources, such as track or MIDI creation requests, retrieval requests, edit requests, download requests etc., or any other source of information that is available from the users of the system.

Applications

The technology is applicable in any situation in which music is used, making it relevant across numerous categories including audio for visual/immersive media (e.g. video, social media, television, advertising, gaming, virtual reality, etc.), personal listening (e.g. music streaming, radio, etc.), and music creation tools (e.g. music production software).

Visual/Immersive Media (e.g. Video, Social Media, Advertising, Gaming, AR/VR, Etc.)

More content is being created than ever before, including user-generated videos, video advertisements, games, and augmented and virtual reality content. However, sourcing music for this content has traditionally been extremely difficult; music is generally expensive, rights are restrictive, and manual editing is required to make the music fit the content in question.

The present technology solves these problems, providing low-cost, rights-cleared, personalized content at scale. Furthermore, the system's ability to create audio tracks in response to a wide variety of data inputs opens up a whole new realm of possibilities for audio-visual experiences, allowing music to be personalized to a content consumer based on inputs such as taste in music (genre, tempo, etc.), situational data (mood, time of day, etc.) and demographic data (location, age, gender, etc.), making the content significantly more effective.

Additionally, the ability of the automatic music production engine 3 to rearrange pre-rendered, human-composed stems means that human-composed songs in existing production libraries can be adapted to fit users' needs. For instance, multiple different versions of a track of different lengths can be generated automatically.

Personalization Use-Cases

A use case is dynamic music creation, through which unique, personalized music can be generated for individual users, specific to their tastes in music and influenced by a variety of other factors, including their mood, the time of day, their location, and other contextual inputs. Moreover, the present technology enables music to react to these factors in real-time.

Music Creation Tools (e.g. Music Production Software)

Historically, music creation has largely been the domain of experts, because of music's high degree of complexity. Over time, successive technological advancements (e.g. the synthesizer, the Digital Audio Workstation) have allowed larger numbers of people to engage with the music-making process. The present technology is a further advancement: it can be used to provide musical assistance to those who are less skilled in music (such as harmonizing their melodies) or provide musical inspiration, as well as increased efficiency, to those who are more skilled.

SUMMARY

The dynamic music creation capabilities disclosed herein can be used to: (i) provide soundtracks for various types of content and in various scenarios (e.g. videos, advertising, video games, retail), (ii) provide audio tracks for distribution via traditional music distribution channels (streaming services etc.), which may dynamically respond to factors specific to the listener, and (iii) provide tools to musicians to aid them in the creative process.

Whilst the above has been described in terms of specific embodiments, these are not exhaustive. The scope of the invention is not defined by the described embodiments but only by the accompanying claims.

The invention claimed is:

1. A music composition system for composing music segments, the music composition system comprising:
an Application Programming Interface (API), wherein the API is configured to process both an internal job request instigated by a component of the music composition system and an external job request originated outside of the music composition system, wherein the API comprises a request manager configured to assign a job identifier to a request for a musical composition;
a controller configured to determine based on the request a plurality of musical parts for the musical composition;
a composition engine configured to generate, for each of the determined musical parts, at least one musical segment in digital musical notation format, wherein the composition engine comprises a plurality of Probabilistic Sequence Models (PSMs), the plurality of PSMs are configured to generate a sequence of musical segments based on probability distribution, the plurality of PSMs each are configured to be specialized for particular musical styles and are associated with a respective style indicator, and the plurality of PSMs are further configured to be coordinated by providing output of one PSM among the plurality of PSMs as input of another PSM among the plurality of PSMs for generating musically cooperating musical segments; and
wherein the at least one generated music segment is stored in association with the assigned job identifier for reproduction at a later time.

2. The music composition system according to claim 1, wherein the controller is configured to determine from the request a style parameter identifying a style attribute for the composition and the composition engine is configured to generate the musical segments based on the style parameter.

3. The music composition system according to claim 2, wherein the one or more of the composition modules are based on the style parameter.

4. The music composition system according to claim 3, wherein each of the composition modules is associated with a respective style indicator, and the one or more composition modules are selected by matching the style parameter to their style indicator(s).

5. The music composition system according to claim 1, wherein the composition engine has a plurality of composition modules, wherein the composition engine is configured to select one or more of the composition modules based on the request.

6. The music composition system according to claim 5, wherein each of the composition modules is in the form of the PSM.

7. The music composition system according to claim 6, wherein the probabilistic sequence model is a trained neural network.

8. The music composition system according to claim 1, wherein the composition engine has a first composition module configured to generate at least a first music segment for a first of the musical parts, and a second composition module configured to generate at least a second music segment for a second of the musical parts based on data of the first music segment.

9. The music composition system according to claim 8, wherein the first music segment embodies a chord sequence and the second music segment embodies a melody or harmony composed to fit the chord sequence.

10. The music composition system according to claim 8, wherein the first music segment embodies a melody and the second music segment embodies a harmonization of the melody.

11. The music composition system according to claim 1, wherein the composition engine has an input configured to receive a percussion part and at least one of the segments is composed based on the percussion part.

12. The music composition system according to claim 11, wherein the controller is configured to determine a set of weightings based on the request and the composition settings are selected probabilistically according to the weightings.

13. The music composition system according to claim 12, wherein the weightings are determined based on the style parameter.

14. The music composition system according to claim 12, wherein the weightings are determined based on the style parameter.

15. The music composition system according to claim 1, wherein the controller is configured to select from a set of available composition parameters composition parameters for the composition of the segments using a probabilistic selection process.

16. The music composition system according to claim 1, wherein the composition engine is configured to store each of the music segments in a database is association with a segment identifier.

17. The music composition system according to claim 16, wherein the job identifier assigned to the request is associated with each of the segment identifiers.

18. The music composition system according to claim 17, wherein the response to the request comprises the job identifier and thereby indicates the music segments.

19. A method of composing music segments, comprising:
receiving from an external device a request for a musical composition via an Application Programming Interface (API), wherein the API is configured to process both an internal job request instigated by a component of the music composition system and a external job request originated outside of the music composition system, and wherein the API comprises a request manager configured to assign a job identifier to the request for the musical composition;
determining based on the request a plurality of musical parts for the musical composition;
generating, by a composition engine, for each of the determined musical parts, at least one musical segment in digital musical notation format, wherein the composition engine comprises a plurality of Probabilistic Sequence Models (PSMs), the plurality of PSMs are configured to generate a sequence of musical segments based on probability distribution, the plurality of PSMs each are configured to be specialized for particular musical styles and are associated with a respective style indicator, and the plurality of PSMs are further configured to be coordinated by providing output of one PSM among the plurality of PSMs as input of another PSM among the plurality of PSMs for generating musically cooperating musical segments;
outputting a response to the request; and
storing the at least one generated music segment in association with the assigned job identifier for reproduction at a later time.

20. A non-transitory computer program product comprising executable instructions stored on a non-transitory computer-readable storage medium and configured, when executed at a music composition system, to cause the music composition system to implement operations comprising:
receiving a request for a musical composition via an Application Programming Interface (API), wherein the API is configured to process both an internal job request instigated by a component of the music composition system and an external job request originated outside of the music composition system, and wherein the API comprises a request manager configured to assign a job identifier to the request for the musical composition;
determining based on the request a plurality of musical parts for the musical composition;
generating, by a composition engine, for each of the determined musical parts, at least one musical segment in digital musical notation format, wherein the composition engine comprises a plurality of Probabilistic Sequence Models (PSMs), the plurality of PSMs are configured to generate a sequence of musical segments based on probability distribution, the plurality of PSMs each are configured to be specialized for particular musical styles and are associated with a respective style indicator, and the plurality of PSMs are further configured to be coordinated by providing output of one PSM among the plurality of PSMs as input of another PSM among the plurality of PSMs for generating musically cooperating musical segments;
outputting a response to the request; and
storing the at least one generated music segment in association with the assigned job identifier for reproduction at a later time.

\* \* \* \* \*